United States Patent
Devani

(10) Patent No.: US 12,551,097 B2
(45) Date of Patent: Feb. 17, 2026

(54) SYSTEMS AND METHODS FOR EVALUATING PUPILLARY RESPONSES

(71) Applicant: BioTrillion, Inc., San Francisco, CA (US)

(72) Inventor: Savan R. Devani, San Francisco, CA (US)

(73) Assignee: BioTrillion, Inc., San Francisco, CA (US)

( * ) Notice: Subject to any disclaimer, the term of this patent is extended or adjusted under 35 U.S.C. 154(b) by 997 days.

(21) Appl. No.: 17/638,127

(22) PCT Filed: Jul. 2, 2020

(86) PCT No.: PCT/US2020/040671
§ 371 (c)(1),
(2) Date: Feb. 24, 2022

(87) PCT Pub. No.: WO2021/040886
PCT Pub. Date: Mar. 4, 2021

(65) Prior Publication Data
US 2022/0361744 A1 Nov. 17, 2022

Related U.S. Application Data

(60) Provisional application No. 62/892,977, filed on Aug. 28, 2019.

(51) Int. Cl.
*A61B 3/00* (2006.01)
*A61B 3/15* (2006.01)
*A61B 5/00* (2006.01)

(52) U.S. Cl.
CPC ............ *A61B 3/0041* (2013.01); *A61B 3/152* (2013.01); *A61B 5/4845* (2013.01)

(58) Field of Classification Search
CPC ....... A61B 3/0041; A61B 3/152; A61B 3/112; A61B 3/113; A61B 3/14; A61B 3/0016;
(Continued)

(56) References Cited

U.S. PATENT DOCUMENTS

| 5,196,872 A | 3/1993 | Ross et al. |
| 9,980,642 B2 | 5/2018 | Finkel |

(Continued)

FOREIGN PATENT DOCUMENTS

| EP | 1755441 B1 | 2/2007 |
| JP | 2002253509 A | 9/2002 |

(Continued)

OTHER PUBLICATIONS

International Search Report and Written Opinion in International Application No. PCT/US2020/040671, mailed Sep. 30, 2020 (8 pages).

(Continued)

*Primary Examiner* — Travis S Fissel
(74) *Attorney, Agent, or Firm* — Nixon Peabody LLP

(57) ABSTRACT

An exemplary system provides a display and a camera on the same side of a device. In some examples, instead of providing a stimulus with a flash of light, the system may utilize the user's eyelids to dark-adapt the pupil and mediate the stimulus using ambient light and/or the light from a display. Use of a front-facing display and front-facing camera further allows the disclosed system to control the ambient lighting conditions during image capture to ensure that additional pupillary stimulation does not occur while measuring the primary pupil response.

20 Claims, 26 Drawing Sheets

(58) Field of Classification Search
CPC ....... A61B 3/0025; A61B 3/0058; A61B 3/10; A61B 3/107; A61B 3/11; A61B 3/145; A61B 3/18; A61B 5/4845; A61B 5/163
USPC ......................................................... 351/206
See application file for complete search history.

(56) References Cited

U.S. PATENT DOCUMENTS

| | | |
|---|---|---|
| 2005/0057721 A1 | 3/2005 | Kolanko |
| 2007/0273611 A1* | 11/2007 | Torch ................ A61B 3/112 345/8 |
| 2009/0213329 A1 | 8/2009 | Kandel |
| 2012/0274906 A1* | 11/2012 | Privitera ............ A61B 3/0083 351/246 |
| 2015/0110372 A1* | 4/2015 | Solanki .................. G06T 5/20 382/130 |
| 2017/0311799 A1 | 11/2017 | Holt et al. |
| 2017/0347878 A1 | 12/2017 | Milea et al. |
| 2018/0153399 A1 | 6/2018 | Fink |

FOREIGN PATENT DOCUMENTS

| | | |
|---|---|---|
| JP | 2007531579 A | 11/2007 |
| JP | 2016537152 A | 12/2016 |
| KR | 20180009303 A | 1/2018 |
| WO | WO 2017/216800 A1 | 12/2017 |
| WO | 2018213245 A1 | 11/2018 |
| WO | 2019023547 A1 | 1/2019 |

OTHER PUBLICATIONS

Lin et al., "A new image processing method for evaluating the pupillary response in a HMD-type eye-tracking device," Optics & Laser Technology, 35(7): 505-515, Oct. 2003.

Mcanany et al.,"iPhone-based pupillometry: a novel approach for assessing the pupillary light reflex," Optometry and Vision Science, 95(10): 953-958, Sep. 17, 2018.

* cited by examiner (a) Light color index

SYSTEMS AND METHODS FOR EVALUATING PUPILLARY RESPONSES

CROSS-REFERENCE TO RELATED APPLICATIONS

This application is a U.S. National Stage of International Application No. PCT/US2020/040671, filed July 2. 2020 which claims priority to and the benefit of U.S. Provisional Patent Application No. 62/892,977, filed Aug. 28, 2019, titled "SYSTEMS AND METHODS FOR EVALUATING PUPILLARY RESPONSES," each of which are incorporated herein by reference in their entireties.

FIELD

The present disclosure relates to systems and methods for measuring and analyzing pupillary responses and their features and metrics.

BACKGROUND

Pupils constrict and dilate in response to various external (e.g., light) and internal (e.g., cognitive/emotional) stimuli. Pupil responses, for instance pupillary light reflex ("PLR"), are evaluated for many aspects of physiologic and behavioral health; conventional measurement methods use a pupilometer. Pupilometers are expensive, costing as much as $4,500, are mainly used in medical settings, and must be used by a trained clinician. Other conventional measurements use a penlight exam, where a clinician directs a penlight towards the patient's eyes and observes the pupils' responses.

SUMMARY

This is simple to perform, but has substantial qualitative drawbacks, including a lack of standardization, a need for deliberate training, variances between different measuring-operators over time, and poor inter-observer reliability or reproducibility. Penlight exams are conventionally used in emergency first aid situations, where rapid, qualitatively-crude assessments, accessibility, and convenience are prioritized over precision. Furthermore, even semi-automated conventional methods for measuring pupillary response require new or external physical hardware to ensure any or all of (1) proper ambient lighting conditions, (2) proper alignment of face/eyes guided by the front of mobile device display, (3) sufficient stimulus for pupillary response, and/or (4) adequate processing power for performing external image processing/feature extraction.

In addition to the disadvantages of conventional pupillary measurement systems, these devices use visible light as the stimulus source followed by visible light as the illumination source for image capture; in some examples, use of the visible light spectrum to measure the pupil post the stimulation phase, may catalyze unintentional pupillary responses, akin to the "observer effect" in physics where the mere observation of a phenomenon inevitably changes that phenomenon — often the result of instruments that, by necessity, alter the state of what they measure in some manner. Furthermore, conventional systems need to (1) provide enough light stimulus to achieve the high levels of contrast required for pupil-iris segmentation and (2) ensure moderately- to well-lit lighting conditions to illuminate the face for adequate image capture.

Lastly, these conventional methods typically only catch signs of disease occurrence after the disease is acutely symptomatic or progressively developed, which may be beyond the most treatable phase of the disease.

The various examples of the present disclosure are directed towards a system for evaluating pupillary light reflex, including a system that requires a user to close their eyelids and open them to deliver a light stimulus. The system includes a mobile device, a camera, a display, a processor, and a memory. The mobile device includes a front side and a back side; the camera and the display are located on the front side of the mobile device. The memory includes a plurality of code sections executable by the processor or one or more processors or servers. The plurality of code sections includes a series of instructions. In some examples, the instructions provide for emitting at least one visible light stimulus by the display. The instructions then provide for receiving, from the camera, image data corresponding to at least one eye of a user. The instructions then provide for processing the image data to identify at least one pupil feature. The instructions then provide for determining a health status based on the at least one pupil feature.

In some examples, the instructions further provide for outputting the health status at the display.

In some examples, processing the image data to identify at least one pupil feature includes preprocessing the received image data.

In some examples, identifying at least one pupil feature based on the received image data includes segmenting the received image data to determine first data portions corresponding to a pupil of the eye and second data portions corresponding to an iris of the eye.

In some examples, the at least one pupil feature includes at least one of: pupil response latency, constriction latency, maximum constriction velocity, average constriction velocity, minimum pupil diameter, dilation velocity, 75% recovery time, average pupil diameter, maximum pupil diameter, constriction amplitude, constriction percentage, pupil escape, baseline pupil amplitude, post-illumination pupil response, and any combination thereof.

In some examples, determining a health status based on the at least one pupil feature further includes: (1) determining a difference between each of the at least one pupil feature and a corresponding healthy pupil measurement, and (2) determining the health status based on the determined difference for each of the at least one pupil feature. For example, the corresponding healthy pupil measurement is retrieved, by the processor, from an external measurement database In some examples, emitting at least one visible light stimulus by the display includes (1) receiving first image data of the eye when no light stimulus is provided by the display, (2) determining an amount of luminous flux to provide based on the first image data, (3) determining an area of the display to output the determined amount of luminous flux, and (4) outputting the determined amount of luminous flux on the determined area of the display. In some examples, second image data of the eye is received after outputting the luminous flux. In some examples, the output luminous flux is adjusted based on the second image data.

In some examples, the instructions further provide for tagging a first pupil response based on the received image data. Second image data is then received. The instructions then provide for determining a change in lighting conditions based on the second image data. A second pupil response is then tagged.

In some examples, the instructions provide for displaying an indication on the display that a user should close their eyes. This may include instructions to close their eyes for a predetermined amount of time. In other examples, this may include instructions to wait for a tone or a vibration to open the user's eyes. Then, the system may receive from the camera, images data corresponding to at least one eye of the user. In some examples, the system may process the image data to determine whether or when the eye of the user has opened (for instance by identifying a pupil or iris in the image). Then, the system may determine a health status of the user based on the at least one pupillary feature and display it on the display.

In some examples, the instructions to the user will be a text based indication on the display with a message. In other examples, the system will provide the user with audio instructions to close their eyes. In other examples, the system will provide the user with another visual indication that is not a text based message.

The present disclosure further provides an exemplary method for evaluating pupillary light reflex. The method provides for emitting at least one visible light stimulus by the display. The method then provides for receiving, from the camera, image data corresponding to an eye of a user. The method then provides for processing the image data to identify at least one pupil feature. The method then provides for determining a health status based on the at least one pupil feature. Additional examples of this method are as described above with respect to the exemplary system.

The present disclosure further provides for a non-transitory machine-readable medium comprising machine-executable code. When executed by at least one machine, the machine-executable code causes the machine to emit at least one visible light stimulus by the display. The code then provides for receiving, from the camera, image data corresponding to an eye of a user. The code then provides for processing the image data to identify at least one pupil feature. The code then provides for determining a health status based on the at least one pupil feature. Additional examples of this code are as described above with respect to the exemplary system.

In another exemplary embodiment, the present disclosure provides another system for evaluating pupillary light reflex. The system includes a hardware device, a camera, a display, a processor, and a memory. The hardware device includes a front side and a back side; the camera and the display are located on the front side of the hardware device. The memory includes a plurality of code sections executable by the processor. The code sections include instructions for emitting at least one visual stimulus by the display. The instructions further provide for emitting at least one non-visible light by an infrared emitting device. The instructions then provide for receiving, from the camera or an infrared detector, image data corresponding to an eye of a user. The instructions then provide for processing the image data to identify at least one pupil feature. The instructions then provide for determining a health status based on the at least one pupil feature.

In some examples, the non-visible light emission has a wavelength between 700 nm and 1000 nm. In some examples, the non-visible light emission includes far infrared wavelengths.

In some examples, the camera is an infrared camera.

In some examples, identifying at least one pupil feature based on the received image data includes (1) determining image contrast of the received image data, (2) determining that the image contrast is lower than a threshold contrast level, and (3) outputting, on the display, a prompt for the user to provide second image data at a more dimly lit location. For example, the at least one pupil feature is determined based on the second image data.

In some examples, the at least one pupil feature includes at least one of: pupil response latency, constriction latency, maximum constriction velocity, average constriction velocity, minimum pupil diameter, dilation velocity, 75% recovery time, average pupil diameter, maximum pupil diameter, constriction amplitude, constriction percentage, pupil escape, baseline pupil amplitude, post-illumination pupil response, and any combination thereof.

In some examples, identifying at least one pupil feature based on the received image data further includes segmenting the received image data to determine data portions corresponding to a pupil of the eye and data portions corresponding to an iris of the eye.

In some examples, the hardware device is a headset.

In some examples, the hardware device is a smartphone.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
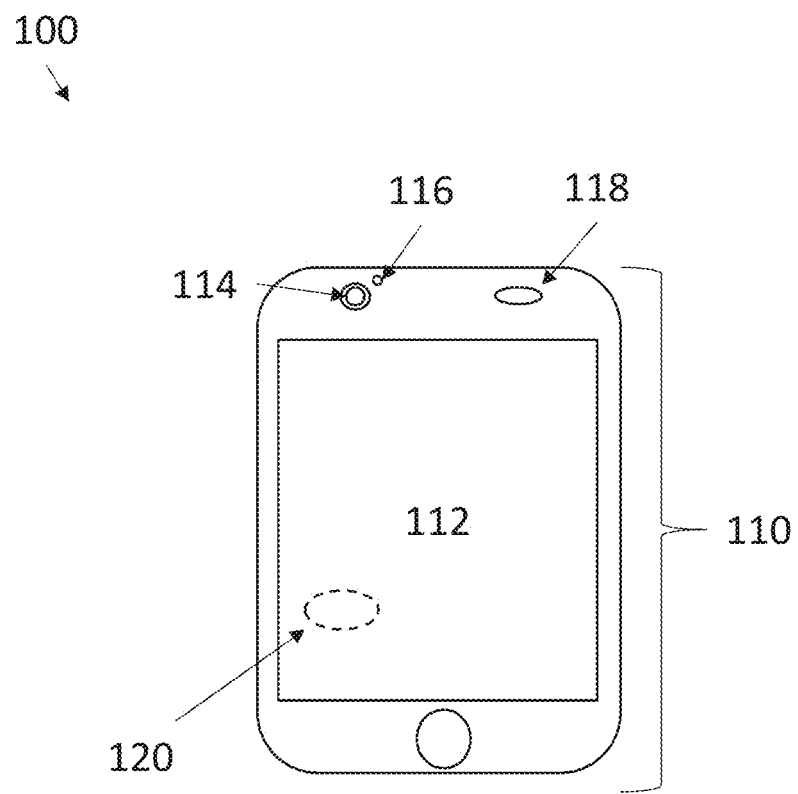
FIG. 1 shows an exemplary system 100, according to some implementations of the present disclosure.

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Overview

The present disclosure is directed to systems and methods for measuring pupillary response. For instance, in some examples, instead of providing a stimulus with a flash of light or display, the system may utilize the user's eyelids to dark-adapt the pupil and mediate the stimulus using ambient light (herein "eyelid mediated response" or "EMD"). Accordingly, when a user closes their eyelids the pupils will undergo the process of dark-adaptation in which the pupils become accustomed to darkness—effectively dilating the pupil. This will serve as a baseline before the light stimulus is applied/allowed (e.g., the user open's their eyes)—facilitating latency and other measurements and constriction without having to separately apply a light based stimulus, in some examples (e.g. without having to use a flash on the back of a mobile device) and therefore allowing a user to use a front facing camera.

For instance, in this example, the system may display instructions for the user to close their eyes for a predetermined amount of time, or until they hear a tone or feel a vibration. This is quite advantageous, because the contrast between the light entering the user's eyes when there are closed and when there are open (and thus allowing all of the ambient light of the room to enter the user's eyes) has been shown by the inventor(s) to be enough to trigger the pupillary reflex and detect differences in pupillary reflex after a user has consumed alcohol or other drugs.

Another exemplary system provides a display and a camera on the same side of a device; the display provides a visible light stimulus to stimulate a user's eye and catalyze a pupillary reflex. The camera simultaneously receives image data of the pupillary reflex. Therefore, an exemplary device according to the present disclosure can provide a more scalable (accessible, affordable, and convenient) and more accurate (objective and quantitative) system than current systems and methods, which can be used by the user with or without a health professional or non-health professional. For instance, in prior systems, a backward facing camera and flash on the back of a smartphone has been attempted to be used to measure pupillary light reflex, but a user would be unable to self-measure their PLR using that system, and thus would require dependence on a second measurement-operator and potential longitudinal measurement inconsistencies stemming from multiple measurement-operators. However, prior systems have not attempted to use the front facing camera because the front of mobile devices do not include a flash and therefore a stimulus could not be generated to initial the pupillary light reflex.

Accordingly, it was discovered that the display on the front of a smart phone or similar device could be utilized to provide the stimulus, based on the methods and features described herein. This is very advantageous, because using a front-facing camera and display allows the users themselves to more accurately and frequently perform the pupillary light reflex measurement using a smart phone or other related device. This makes the disclosed system more scalable generally, because it is more affordable, easier to use, etc. For instance, the user can line up the eyes correctly because the display is also on the front side of the device, without help from another individual. This allows the user to frequently perform the measurement because they do not require another caregiver to perform the measurement. Thus, the system allows the user to collect data more frequently and obtain longitudinal data on their health conditions (whereas single measurements may not be sufficient to identify certain conditions where longitudinal data is required, including for establishing baselines and deviations from baselines). Additionally, utilizing the display to provide the stimulus will allow the system to have more precise control and variability of the stimulus given the range of intensities and colors that may be displayed. Finally, in some embodiments that utilized infrared detection, this system may be particularly advantageous because the infrared detection will allow a sufficient pupillary response to be generated by the eye, because measurement light will not cause a secondary response of the pupils—which is important because the display has a lower maximum intensity than a rear facing flash, and thus a secondary response may prohibit the ability to record a sufficient pupillary light reflex. In some examples, the disclosed system includes a smartphone or other handheld computing device. Such a system allows frequent and accurate data collection, which can provide important quantitative data on user health. In some examples, as discussed further herein, the present disclosure provides for collection of longitudinal health data, which can be used to create baseline pupillary metric measurements for a user. Therefore, the present disclosure provides measurements pre-diagnosis, pre-trauma, and/or pre-disease, which can be used to monitor disease and/or trauma progression and/or establish an individualized longitudinal healthy baseline.

In some examples, the visible stimulus generates sufficient photonic energy to catalyze a full pupillary reflex. Exemplary methods further include collecting data before the light intensity threshold is reached, and determining pupillary metrics as a function of other factors that affect pupillary response. Use of a front-facing display and front-facing camera further allows the disclosed system to control the ambient lighting conditions during image capture to ensure that a secondary accidental pupil response is not initiated when measuring the first, intentional pupil response. In some examples, an exemplary method detects ambient light levels to account for an effect that the ambient light levels had on the detected pupillary metrics. In some examples, the data collected before the light intensity threshold is reached provides baseline values for a user's pupillary metrics.

Some examples of the present disclosure further provide for using a visible stimulus to illuminate the face and then using a non-visible emission for image capture. Use of the non-visible avoids unintentionally stimulating reflexes that adulterate the data. Additionally, due to the high level of contrast required between the light stimulus intensity and ambient lighting conditions in order to catalyze pupillary light reflex, performing an assessment in dimly-lit conditions may be beneficial in some examples. In some examples, though, performing an assessment in a dimly-lit area poses problem as the darkness of the room may interfere with capturing a high-quality eye image. For example, there is often minimal contrast between the pupil and iris components, particularly in an individual with higher pigmented, or darker irises. Distinguishing between these two features is critical to properly segment the features for extraction and metric computation. An infrared camera or other infrared hardware further provides high-resolution pupil images for effective feature segmentation.

System for Measuring Pupil Metrics

FIG. 1 provides an exemplary system 100, according to some implementations of the present disclosure. In some examples, system 100 is a smart phone, a smart watch, a tablet, a computing device, head gear, head set, virtual reality device, augmented reality device, or any other device capable of receiving and interpreting a physical signal. System 100 includes a housing 110, a display 112, a camera 114, a speaker 118, a vibration motor 120, and a sensor 116. FIG. 1 shows a front side of the system 100. The system may also include a camera 114 on the back side of the housing 110 (not shown).

The housing 110 provides a case for the display 112, the camera 114 the speaker 118, the vibration motor 120, and the sensor 116. The housing 110 further includes any computing components (not shown) of the system 100, including, for example, a processor, a memory, a wireless communication element, and any other elements as readily contemplated by one skilled in the art. The computing components further include any software configured to complete any of the processes discussed further herein.

The display 112 is, for example, the screen of a smartphone, a smart watch, an optical headset, or any other device. In some examples, the display 112 is an LCD screen, an OLED screen, an LED screen, or any other type of electronic display, as known in the art, which shows images, text, or other types of graphical display. For example, the screen provides a plurality of light-emitting diodes or other means for generating a plurality of pixels. Each pixel displays a light stimulus.

The display 112 is configured to emit visual light. In some examples, the display 112 emits light on a portion of a surface area of the display 112; in other examples, the display 112 emits light on all of a surface area of the display 112. The light emitted by the display 112 can be controlled to automatically emit light, and increase or decrease the visible stimulus. In some examples, the display 112 shows image data captured by the camera 114. The display 112 can also display text and messages to a user. In some examples, the display 112 may display a live feed of image data output from the camera 114.

The camera 114 or cameras 114 receives image data of a field of view in front of the camera 114. In some examples, the camera 114 receives photographic and/or video data. In some examples, the camera 114 receives continuous photographic data (e.g., at intervals of seconds, milliseconds, or microseconds). In some examples, the camera 114 is a visual light camera. In some examples, the camera 114 is an infrared camera and includes an infrared light emitter. In some examples, the camera 114 automatically initiates image data capture based on detecting certain stimulus (for example, a face of a user, an eye of a user, a pupil of a user, and/or an iris of a user). In some examples, the camera 114 is multiple cameras.

The sensor 116 includes, for example, any of a light sensor, a proximity sensor, an ambient sensor, and/or an infrared sensor. In some examples, the sensor 116 is communicatively coupled to the camera 114 and is configured to initiate and/or terminate image data captured by the camera 114. As shown, the sensor 116 is on the same side of the system 100 as the camera 114. In some examples, the sensor 116 is placed proximally close to the camera 114.

Figure 2:
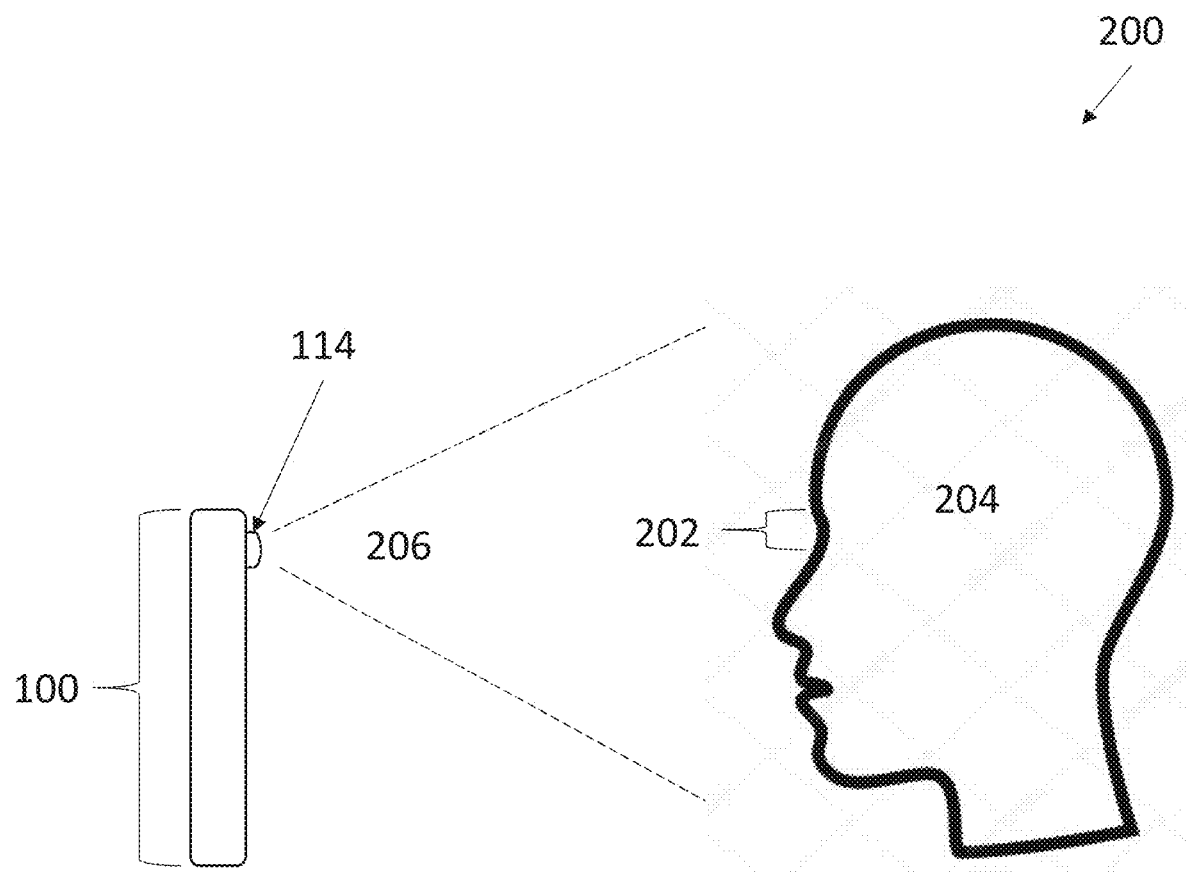
FIG. 2 shows an exemplary system 200 for measuring pupillary response, according to some implementations of the present disclosure.

FIG. 2 shows an exemplary system 200 configured to receive image data of a user's face, according to some implementations of the present disclosure. System 200 includes system 100, camera 114, a user's eye 202, a user's head 204, and a camera field of view 206. System 100 and camera 114 can be as discussed above with respect to FIG. 1. FIG. 2 shows that system 100 can be positioned such that the camera 114 faces a user 204. For example, the eye 202 of a user 204 can be with in the field of view of the camera 206. Various embodiments of the present disclosure can be performed when a user 204 positions system 100 in front of his face.

Methodology for Analyzing Pupil Response

Pupillary Light Reflex (PLR) describes the constriction and subsequent dilation of the pupil in response to light, which can serve as an important metric of autonomic nervous system function. The measurement of PLR can be used as an indicator of abnormalities with various nervous system pathways in the neurological system (and potentially other systems) and subsequently for detection of developing disease purposes. As described herein, a "heath status" can include the pupillary light reflex measurement itself.

For example, alcoholism, mental health disorders such as seasonal affective disorders, schizophrenia and generalized anxiety disorder, Alzheimer's and Parkinson's diseases, autism spectrum disorders, as well as glaucoma and autonomic neuropathies associated with diabetes may result in anomalies in PLR. The methodology described below describes one such measure of one component of the PLR, performed via the use of a smartphone or analogous device. In some embodiments, the smartphone may not only capture the phenotypic data for the PLR measurement, but also process the data locally and in real-time. Similarly, other quantifiable feature extractions measured from the eye/face (such as sclera color and deposit density) might also be processed locally. Thus, the user's privacy may be better preserved and the time taken for the measurement may be reduced. The method and system may also allow for the calculation of dynamically changing diameter of pupil. The method and system may generate a more robust baseline upon which to detect real-time detect statistical deviations. Such deviations may be a sign of an anomaly in the physiologic system from which the measure is causally connected.

The PLR measure described herein can be temporally and spatially coupled with other measures including, but not limited to: the voluntary reflex of a user's blink speed in response to the word "blink" projected on a screen, read by the user, neuronally processed through the motor cortex to then result in a measurable blink of the eye or eyes (which could be a measure of physiologic changes taking place in the voluntary nervous system pathway), sclera (white of the eye changing its gradients of color to red or yellow) other eye features and the iris and corneal ring (e.g. cholesterol deposits and cardiovascular risk), and several other measured features extracted from the face/eye. These features can be measured within spatial and temporal proximity by a user, providing a more efficient user experience, and can be quantitatively and longitudinally (throughout time) measured and baseline-established on an individual basis conveniently, affordably, and accessibly from a users' life setting (e.g. home, or non-medical). Such data may generate insights into various physiologic systems (e.g. neuro, cardio, etc.)—prior to entering a medical setting—and on a mass, statistically significant scale, as described herein.

Figure 3:
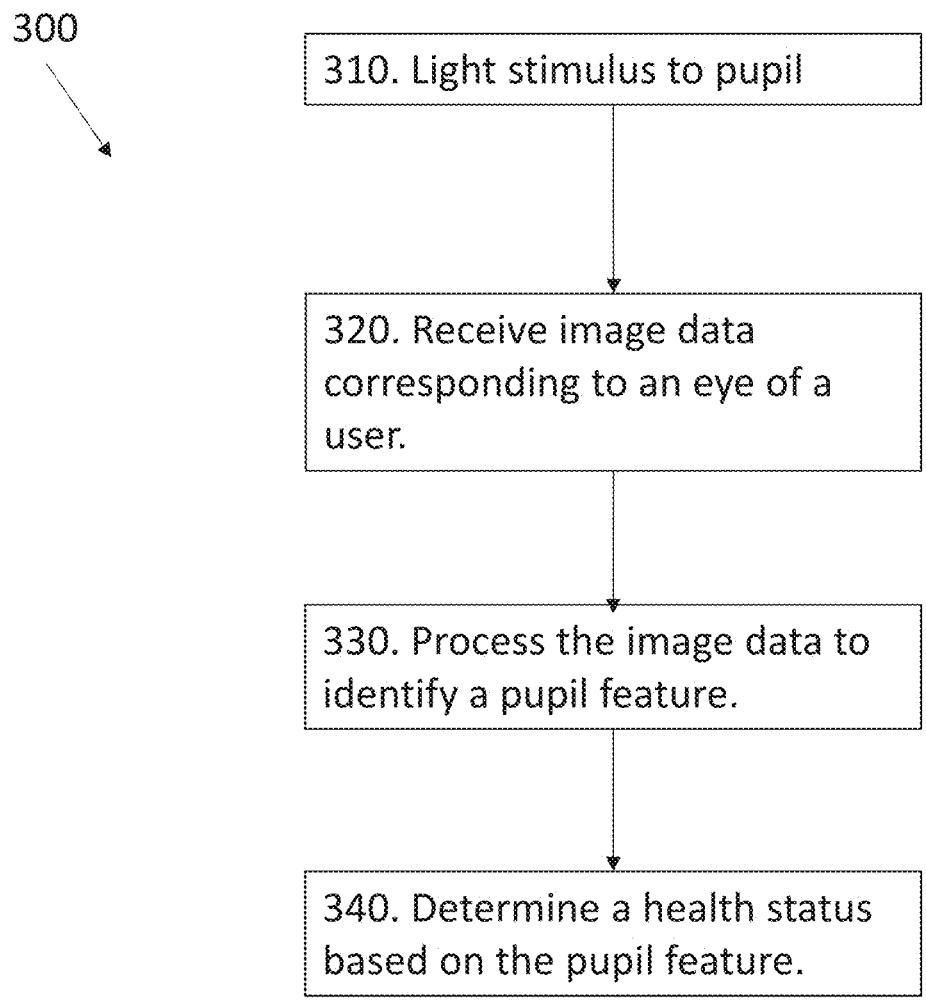
FIG. 3 shows an exemplary methodology 300 for identifying and analyzing pupil features, according to some implementations of the present disclosure.

FIG. 3 shows an exemplary methodology 300 that can be performed according to the various embodiments of the present disclosure. Methodology 300 can be performed on systems 100 and 200 as discussed with respect to FIGS. 1 and 2. In some examples, methodology 300 is performed in a dark room, a dimly lit room, a room with natural light, or any other setting. In some examples, methodology 300 is performed repeatedly, including, for example, performed at night or before bedtime by a user when external variables such as light are at a minimum and controllable.

Methodology 300 begins at 310 by, in some examples, emitting a visible light stimulus by a display (e.g., display 112 or sensor 116 of FIG. 1) or providing a light stimulus by providing an indication on a display that the user should close their eyes for a predetermined amount of time. The light stimulus, for example, causes pupil constriction. In some examples, the pupil constriction increases as a contrast increases between the visible light stimulus and an ambient light level. The amount of visible light stimulus provided can be as determined by methodology 1400 of FIG. 4, discussed further below.

Figure 12:
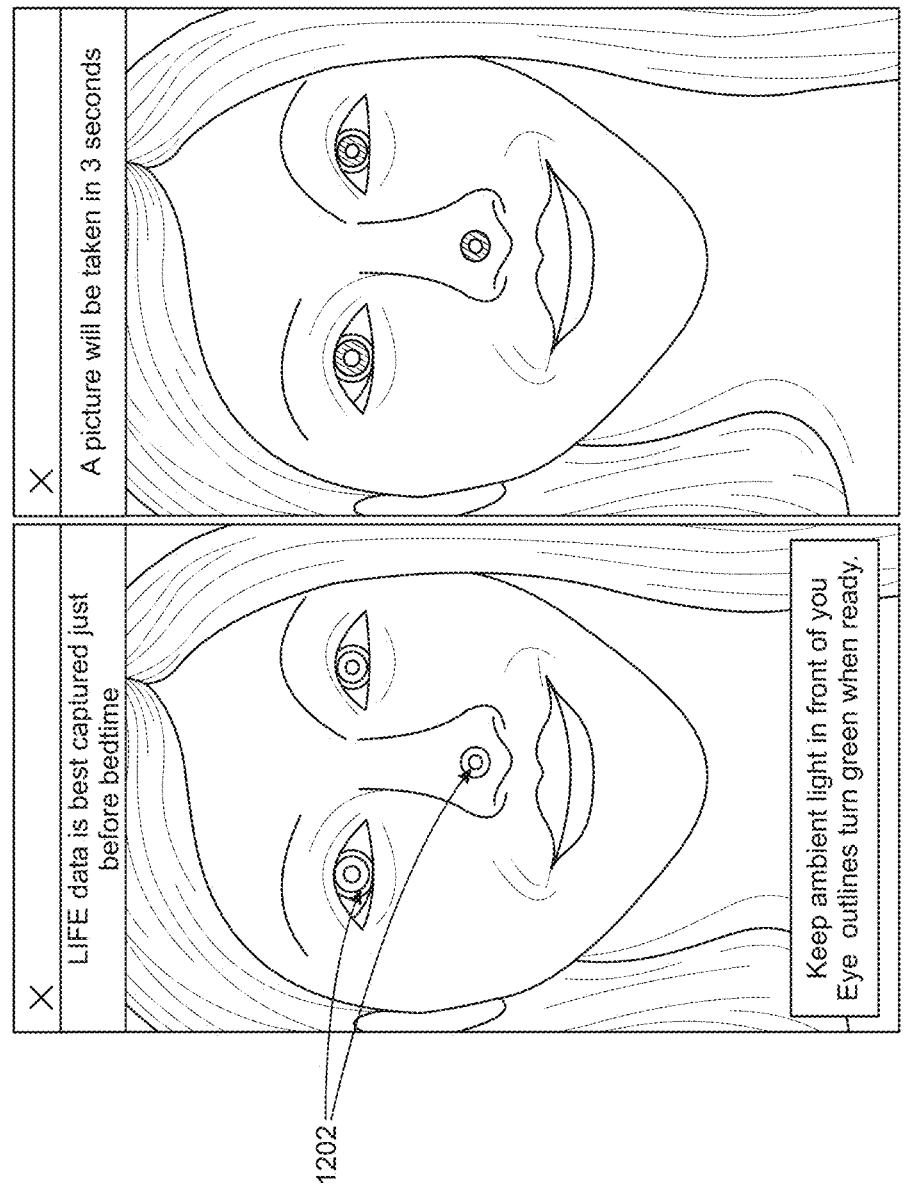
FIG. 12 shows an exemplary software application implementation which automatically detects proper lighting and spatial orientation, according to some implementations of the present disclosure.
Figure 13:
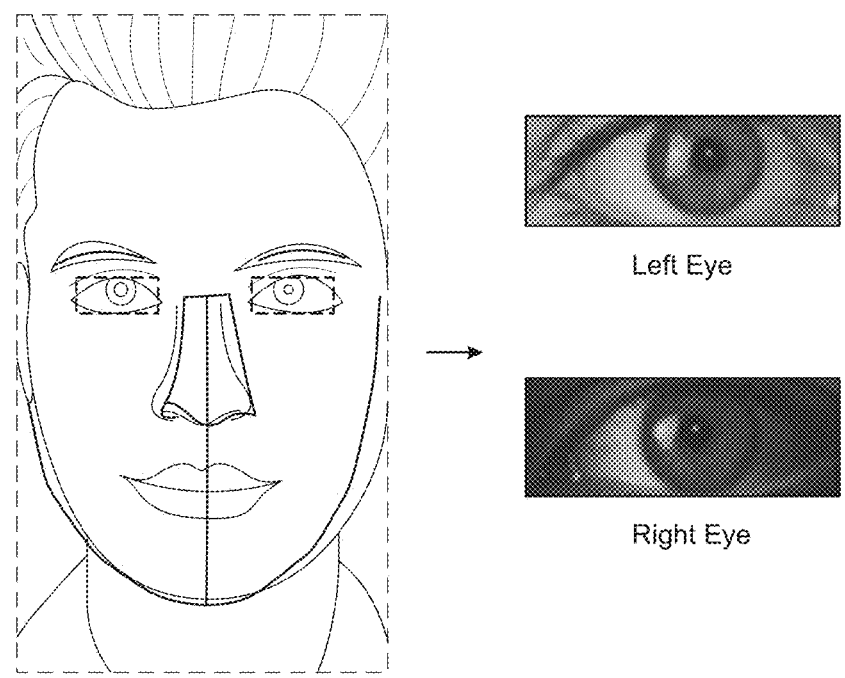
FIG. 13 shows exemplary eye bounding detection, according to some implementations of the present disclosure.

In some examples of 310, the visible light stimulus is automatically emitted when a camera (e.g., camera 114 of system 100 of FIG. 1) detects that a user's face (e.g., user 204 of FIG. 2) is at an appropriate spatial distance. In other examples, the screen may display a message to the user to close their eyes once their face is detected. In some examples, the display first emits a notification that there will be an imminent display light stimulus. Turning briefly to FIG. 12, for example, the display can show real-time captured image data of the user's face and provide a visual graphic that a user's features are properly detected. In some examples, the display is the display 112 of FIG. 1. For example, circles 1202 can be placed on the user's eyes or nose. Turning briefly to FIG. 13, the display shows exemplary bounding boxes for the user's eyes, mouth, and nose.

Referring back to FIG. 3, in some examples, 310 provides for first detecting a pupil. If the pupil is not detected, the user is notified that the setting does not meet the criteria for methodology 300.

Methodology 300 then provides for receiving image data corresponding to an eye of a user at 320. Exemplary image data includes video and/or photographic data. In some examples, the image data is collected (e.g., collected by camera 114 of FIG. 1) over a period of time. In some examples, a video is recorded between 30-60 frames/sec, or at a higher frame rate. In some examples of 320, a set of still images are produced by a camera. In some examples of 320, the image data is captured as a gray-scale video/image set, or is converted to grayscale after being received.

In some examples of 320, certain visual stimuli are included, such as a reflection of red eye, a pupil response, iris and sclera data, eye tracking data, and skin data.

Methodology 300 then proceeds to process the image data to identify a pupil feature, at 330.

In some examples of 330, the received image data is first pre-processed to filter the data. Exemplary types of data pre-processing are discussed further below. In a brief exemplary protocol for pre-processing data, the image data of 320 is cropped and filtered to obtain a region of an image. For example, the image is filtered based on set thresholds for brightness, color, and saturation. The image data is then converted to gray scale to improve contrast between a pupil and an iris, and the pupil-iris boundary is demarcated. In some examples of 330, shape analysis is performed to filter the image data based on a pre-selected circularity threshold. For example, the pixels are scanned for contour and convex shapes to perform the shape analysis. In some examples of 330, a baseline image is compared to the received image data of 320 to aid in pre-processing.

In some examples, 330 further provides for determining a surface area of pupil and iris regions, as detected in the image data. For example, imaging analysis software algorithms determine pupil size parameters across a series of recorded images by evaluating the elapsed time between each image to determine the rate at which the pupil size changes over time.

In some examples, identification information is optionally removed from the sensor data at 330. Stated differently, the most relevant key phenotypic features of interest may be extracted from the raw image data. Exemplary features include: pupil velocity (e.g. magnitude and direction), sclera color, a measure of tissue inflammation, and/or other characteristics. These features can be represented as scalar numbers after extracting relevant metrics from the underlying raw data. The image of the user that may be identifiable is not utilized.

In some examples, 330 provides for determining whether additional data is needed. For example, an alert is provided at a display to identify the type of measurement that is needed and user instructions for capturing the appropriate type of measurement.

In some examples of 330, the features include: (1) pupil response latency, which includes the time taken for a pupil to respond to a light stimulus measured, for example, in milliseconds; (2) maximum diameter, which is the maximum pupil diameter observed; (3) maximum constriction velocity (MCV), which is the maximum velocity observed over the constriction period; (4) average constriction velocity (ACV), which is the average velocity observed over the total constriction period; (5) minimum pupil diameter, which is the minimum diameter observed; (6) dilation velocity, which is the average velocity observed over the total dilation period; (7) 75% recovery time, which is the time for the pupil to reach 75% of its initial diameter value; (8) average diameter, which is an average of all diameter measurements taken in a time series; (9) pupil escape; (10) baseline pupil amplitude; (11) post-illumination pupil response; (12) maximum pupil diameter; (13) any other pupillary response measurements, as known in the art; and (14) any combination thereof. In some examples of 330, similar metrics are determined of the iris.

For example, constriction latency is measured as constriction($t_{flash}$)–constriction($t_{initial}$). For example, constriction velocity is a measure of the rate at which the pupil constricts in millimeters/second. For example, constriction amplitude is measured as (Diameter$_{max}$ prior to light exposure)–(Diameter$_{min}$ following light exposure). For example, constriction percentage is measured by taking the constriction amplitude as a percentage of Diameter$_{max}$. For example, dilation velocity is a measure of the rate at which the pupil dilates in millimeters/second. Many of the features listed above can be derived by evaluating the diameter of the pupil at a first image, the diameter of the pupil at a second image, and a length of time between the two images, as would be readily contemplated by a person skilled in the art. Furthermore, a person skilled in the art would readily understand that dilation latency, dilation velocity, dilation amplitude, and dilation percentage can be similarly calculated based on the data provided at 320.

Additional features include, for example: the voluntary blink reflex speed in response to screen projected word "blink" (which could be a measure of the voluntary nervous system pathway), sclera (white to yellowing of the eye) color features, iris and corneal ring features (cholesterol deposits and cardiovascular risk), and several other measured features extracted from the face/eye.

Some examples of 330 provide for interpolating or extrapolating pupillary measures based on the trajectory observed of the collected image data.

Methodology 300 then provides for, at 340, determining a health status based on the pupil feature identified in 330. In some examples, the health status will be the pupillary light reflex measurement itself or other clinically relevant pupillary measures or features. In some examples of 340, the features, as determined at 330, are compared to corresponding values of healthy individuals in order to identify abnormalities. In some examples, the features are compared to longitudinal data of the user; variations in currently-measured values from an established longitudinal baseline (individual) can be indicative of a disease state or a performance measure for disease. In some examples of 340, an individual user baseline is established over longitudinal use of a system 200 and a notification is provided when the pupil feature identified in 330 deviates from the established individual baseline by 1.5 standard deviations or by another, predetermined threshold deviation. For example, the threshold deviation varies according to disease state. In some examples, 340 relies on a universal, or external, database of healthy individuals until the individual user has provided twenty separate PLR measures according to methodology 300.

In some examples of methodology 300, the image data includes data of both eyes of a user. At 330, each pupil's reflex is analyzed separately; but, at 340, the features of the two are analyzed together to determine a health status, as varying pupillary light reflexes between each eye can be telling of a diseased state (e.g. stroke).

In some embodiments of methodology 300, an alert is provided based on the received data. For example, if a digital marker for a disease is detected, then a pre-disease detection alert is received by system 100, and presented, for example, on display 112. In some embodiments, an audio alert can supplement or replace a graphical alert. The user is thus made aware of developing diseases, disorders, or disease precursors and can take further action. Other information described above, such as a suggestion to contact a physician for a physical examination, may also be received and presented to the.

In some examples of system 200 of FIG. 2 and methodology 300 of FIG. 3, a smartphone is held in hand in and in a natural controlled viewing spatial distance from a user's face (e.g. within 6-24, or 6-12 inches horizontally from the user's face, within 6 inches vertically from the eye level and within 6 inches horizontally (right to left on the user) of the user's nose, though other distances may be possible), indoors with controlled ambient light. In some embodiments, holding the smartphone in this position for a controlled amount of time (e.g. at least 5 seconds), will activate an App (via sensors and software) to video record a subject's face (particularly the eye and reflex of the pupil) at 60+ or 120+ frames per second in HD upon being catalyzed by a stimuli of a brief intense flash of light provided from the touchscreen or other light source on the smartphone during recording or from display indicating the user should close their eyes for a predetermined amount of time. In some examples, the flash of light is focalized and of known intensity from both its origin and the intensity of light reaching the pupil can also be inferred by its known inverse relationship with the square of the distance from the source and the pupil. Thus, images of the user's face are captured before, during and after the brief flash of intense light. In some embodiments, the recording starts at least 1 second and not more than 5 seconds before the flash of light or the user is instructed to open their eyes and continues for at least 3 seconds and not more than 8 seconds after the flash of light or the user has opened their eyes. Of note, the intensity that reaches the pupil can be inferred by its known inverse relationship with the square of the distance between pupil and light source.

Exemplary Pupil Response Curves

Figure 4A:
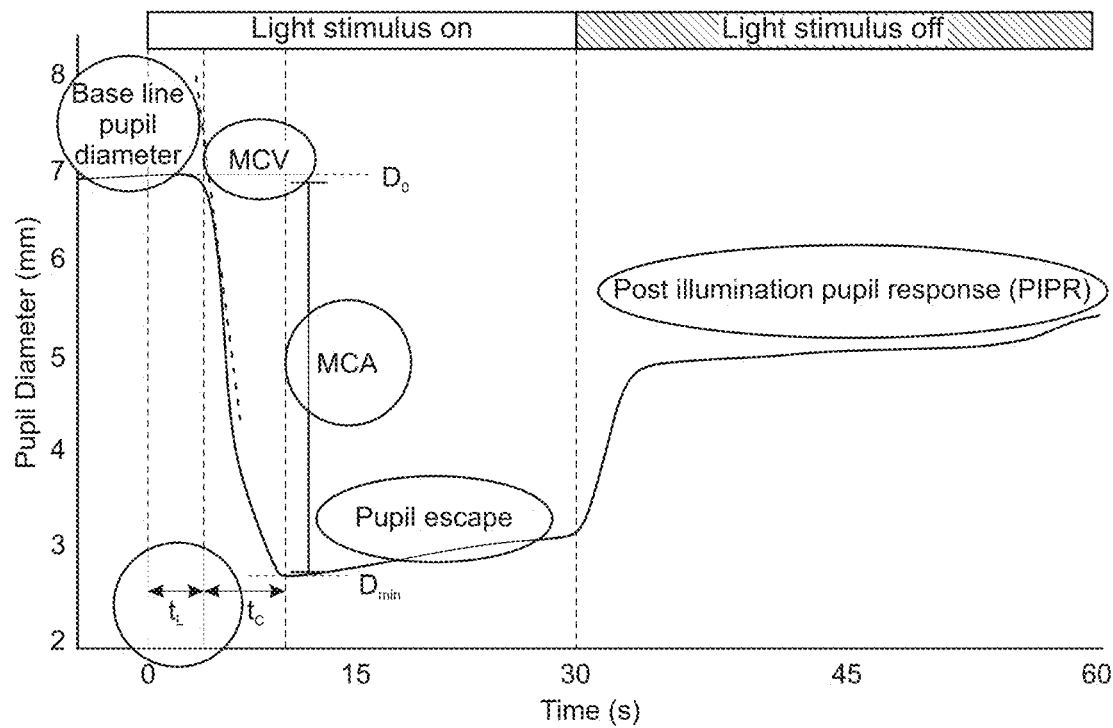
FIG. 4A shows an exemplary pupillary response separated into sub-phases, according to some implementations of the present disclosure.

FIG. 4A shows an exemplary pupil response curve and the various features that can be identified at different points in the curve. For example, these features are analyzed with respect to methodology 300, discussed above. FIG. 4A demonstrates that when a light stimulus is provided, a baseline pupil diameter is first detected; MCV, MCA, and pupil escape are subsequently evaluated. When the light stimulus is turned off, a post-illumination pupil response (PIPR) can be evaluated.

Figure 4B:
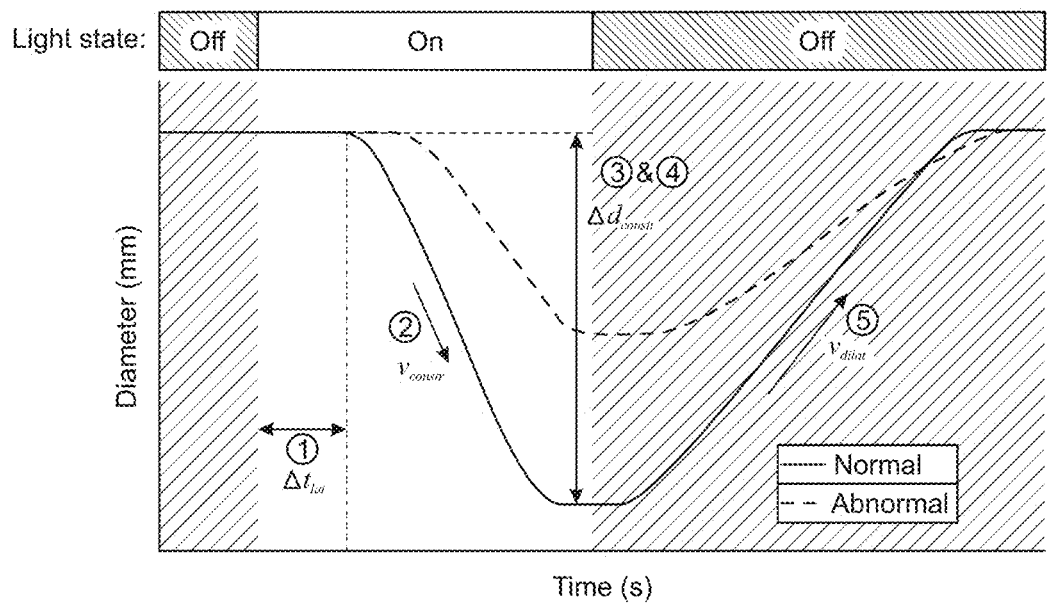
FIG. 4B shows exemplary pupillary responses as compared between a healthy and unhealthy subject, according to some implementations of the present disclosure.

FIG. 4B shows another exemplary PLR curve, including: (1) latency, (2) constriction velocity, (3) constriction amplitude, (4) constriction percentage, and (5) dilation velocity. The dashed line shows an abnormal PLR curve with increased latency, slower velocities, and diminished amplitude than the normal PLR curve shown by the solid line.

Pre-Processing & Processing the Data

In some examples of 330, the received image data is pre-processed. Exemplary pre-processing techniques are discussed herein.

Frames in the sequence are smoothed to de-noise the system of natural fluctuations in the pupil, color variance in the irises, as well as variance caused by the device itself. A Gaussian smoothing operator can be used to slightly blur the images and reduce noise. The 2D Gaussian equation has the form:

$$G(x, y) = \frac{1}{2\pi\sigma^2} e^{\frac{-(x^2 + y^2)}{2\sigma^2}} \quad \text{Equation 1}$$

where sigma is the standard deviation of the distribution, which may be given by:

$$\sigma = \sqrt{\frac{1}{N} \sum_{i=1}^{N} (x_i - \mu)^2} \quad \text{Equation 2}$$

where x is the $i^{th}$ PLR measurement, $\mu$ is the mean PLR, and N is the total number of PLR measurements. In some embodiments, a particular measurement of PLR that is probabilistically significant, such as +/− one standard of deviation or +/− 1.5 standards of deviation, trigger an alert that an anomaly was detected in the neurological system. In some such embodiments, the alert may be for a particular pre-disease condition. In other embodiments, the alert may simply indicate that an anomaly was detected.

In some examples of the present disclosure, PLRs are represented as smooth Fourier transformations. For example, when using a histogram representation of the smoothed grayscale frames, a threshold function binarizes the images. This threshold function can be determined by the distinction between dark and light pixels on the histogram. Based on this, the images can be binarized in such a way that distinguishes the sclera from the pupil by labelling white parts of the image with a 1, and black parts of the image with a 0. This effectively generates a black square with a white circle representing the pupil clearly for analysis. Pupils are generally shaped as ellipses, but can be represented as a circle by averaging the axes. Diameter can be measured in pixels between the two white pixels farthest away from each other. This pixel measurement can be converted to millimeters using a fiducial of known dimensions held near the eye. For example, depth of the smartphone from the face might be determined using a dot projector in a smartphone.

The differential equation that describes a pupillary light reflex in terms of pupil diameter flux as a function of light can be written as follows:

$$\frac{dM}{dD}\frac{dD}{dt}(t) + 2.3026 \tanh^{-1}\left(\frac{D - 4.9}{3}\right) = \quad \text{Equation 3}$$

$$5.2 - 0.45 \ln\left(\frac{\psi[t - \tau\tau]}{4.8118 * 10^{-10}}\right)$$

$$M(D) = \tanh^{-1}\left(\frac{D - 4.9}{3}\right) \quad \text{Equation 4}$$

D is measured as the diameter of the pupil (mm), and $\Phi(t-\tau)r$ represents the light intensity that reaches the retina in time t. Thus, using the data from the video (e.g. the diameter of the white circle representing the pupil in each frame, the time between frames and the conversion between pixels to millimeters), the differential equation above may be utilized to determine the pupil velocity. The pupil velocity both in reacting to the flash of light (decreasing in diameter) and recovery (increasing in diameter) can be determined.

In some examples, pre-processing includes cropping the footage to include a region of each individual eye. This could be implemented by applying the simple heuristics of the known structure of the human face. The footage can then be submitted for processing, which includes, for example, deconstructing the received visual stimulus into a series of images to be processed one by one. Images are manipulated to eliminate the aberrations of eye glasses, blinking and small hand movements during image capture. Pupil boundary detection using entropy of contour gradients may be used to extract the size of each pupil and create data series which could be visualized.

In some embodiments, an eye tracker may be used to capture frames of eyes with different levels of dilation. The user can manually tag the pupil diameters for each frame. Using the tagged data, a segmentation model can be trained using the tagged pupils. For example, U-Net or an analogous service might be used to output shapes from which diameter may be inferred. A pipeline may be implemented to process recorded frames of video and graph the pupil dilation over time.

In some examples of processing the data, hue, saturation, and brightness values are used to filter the received image data. For example, pixels may be filtered out if the pixels have a "V" value (which represents brightness) of greater than 60. In another example, the pixels may be filtered based on LAB values, where "L" represents a brightness of the pixel, and "A" and "B" represent color-opponent values. Because the pupil is the darkest feature of the eye, pixels may be filtered out which have an "L" value greater than 50, thereby leaving only the pixels which are relatively darker and more likely to include the pupil.

Additional exemplary processing steps include (1) duplicating the filtered image, discarding what has been filtered out to just show the region of interest (ROI), (2) converting the filtered ROI pixels to grey scale, (3) filtering grey scale pixels based on brightness or intensity values, for example, by filtering pixels having an L value higher than 45, (4) scanning the remaining pixels for contours and convex shapes, (5) scanning the pixels for incremental gradients in grey scale values of pixels, (6) constructing shapes based on, or defined by, the contours, (7) filtering those shapes based on size and circularity, (8) determining a surface area of pupil region and iris region, and (9) determining a relative change in the two regions over time.

In some examples of filtering based on circularity, the device filters out values which are not at or around a 1.0 circularity value. For example, circles have circularity values at or near 1.0, while an elongated ellipse may have a circularity value of around 0.25.

Predicting Health Status based on Pupil Features

Figure 5:
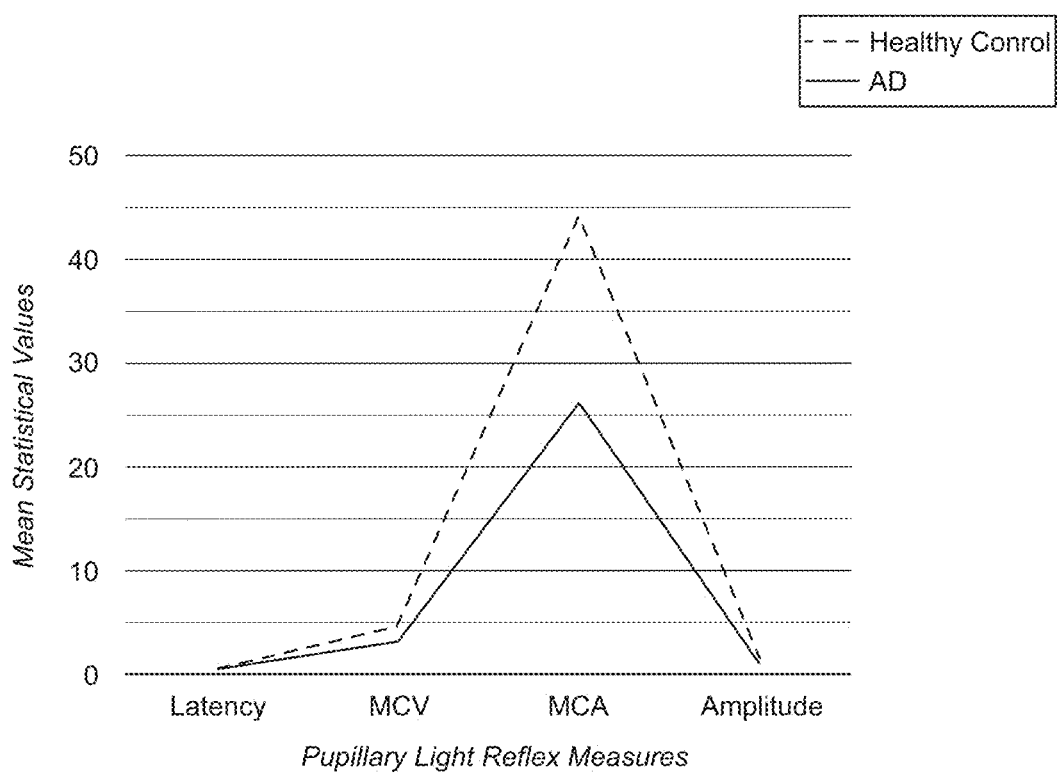
FIG. 5 shows average measured pupillary responses, according to some implementations of the present disclosure.

Various aspects of 340 of methodology 300 of FIG. 3 can be used to identify whether the user has various disease states, disease severity, or other health ailments. FIGS. 5-7 below demonstrate exemplary data that corresponds to exemplary health statuses.

FIG. 5 shows average measured pupillary responses correlate to Alzheimer's Disease. For example, FIG. 5 shows that latency, MCV, MCA and Amplitude have significant differences between a group with cognitively healthy patients and a group with Alzheimer's Disease patients.

Figure 6A:
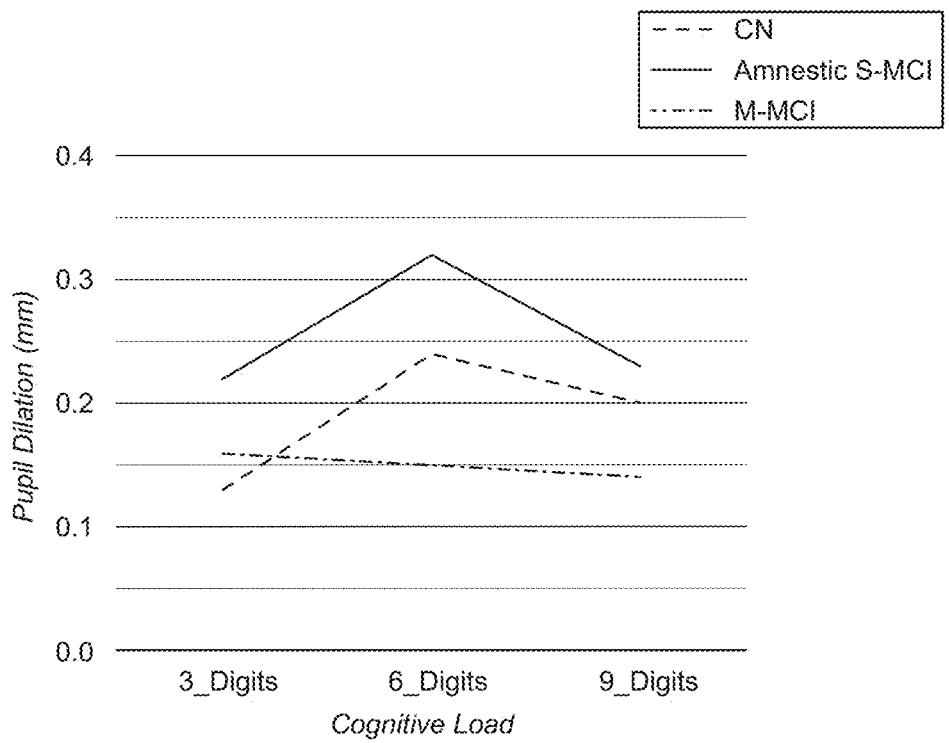
FIG. 6A shows exemplary pupillary responses to cognitive load, according to some implementations of the present disclosure.
Figure 6B:
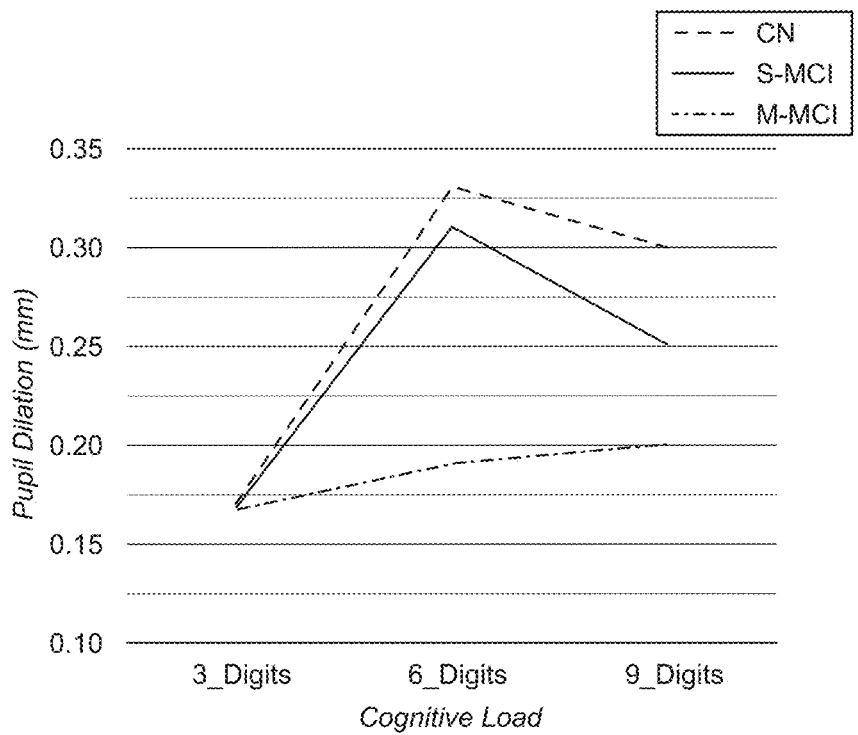
FIG. 6B shows exemplary pupillary responses to cognitive load, according to some implementations of the present disclosure.
Figure 7:
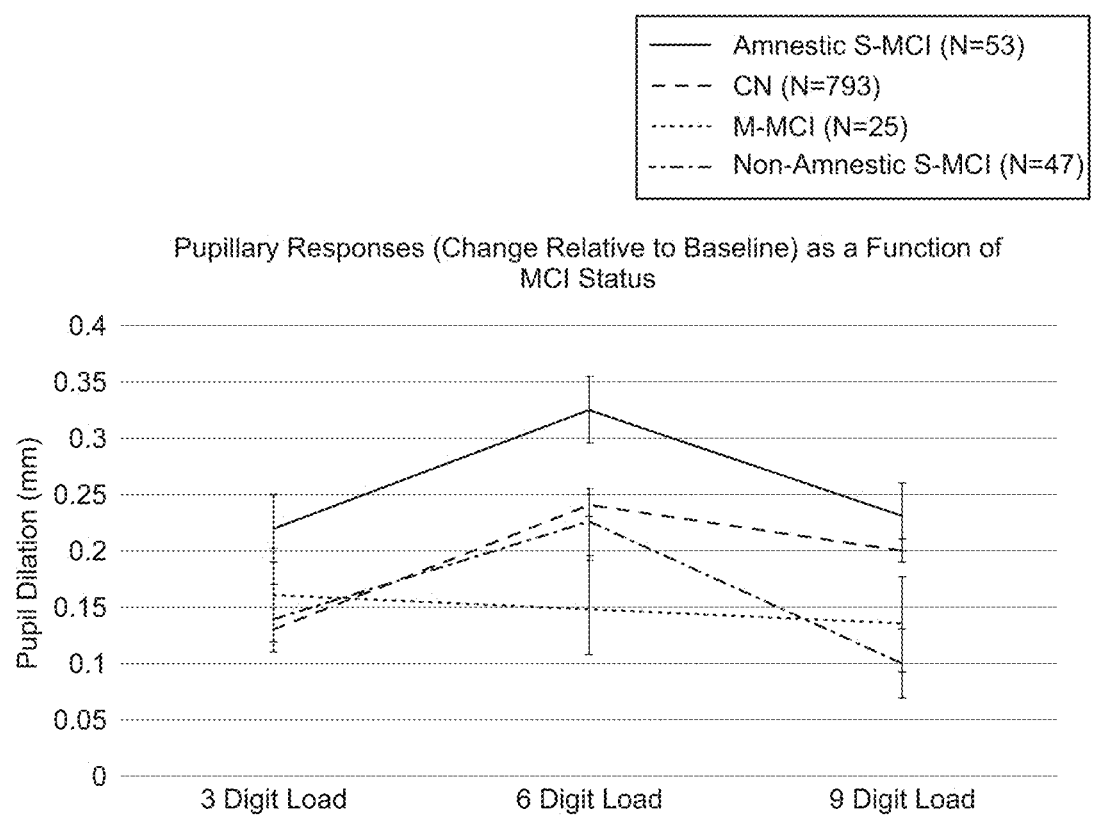
FIG. 7 shows exemplary pupillary responses as a function of mild cognitive impairment, according to some implementations of the present disclosure.

FIGS. 6A-6B show exemplary pupillary responses to cognitive load, according to some implementations of the present disclosure. FIGS. 6A-6B demonstrate that the psychosensory pupil response and Alzheimer's Disease are correlated. Cognitive load is measured by whether a subject can recall spans of 3, 6, or 9 digits. FIGS. 6A-6B demonstrate that with increased cognitive load, the amnestic single-domain mild cognitive impairment (S-MCI) group showed significantly greater pupil dilation than a cognitively health control group (CN). Furthermore, at certain cognitive loads, the multi-domain mild cognitive impairment (M-MCI) group showed significantly less dilation than both the cognitively normal and S-MCI groups. This indicates a cognitive load well beyond the capacity of the group.

FIG. 7 shows exemplary pupillary responses as a function of mild cognitive impairment, according to some implementations of the present disclosure. For example, this data shows pupil dilation increases in response to a 6-digit load from a 3-digit load, but decreases once capacity is reached at a 9-digit load. Therefore, the present disclosure contemplates that individuals with lower cognitive ability would show greater pupil dilation under lower loads and less at higher loads.

Pupil Segmentation

The present disclosure provides for pupil segmentation methods. The image data of the eyes can be segmented into three main parts: pupil, iris, and sclera. Image Segmentation Algorithms might be used to provide the desired segmentation.

Figure 8:
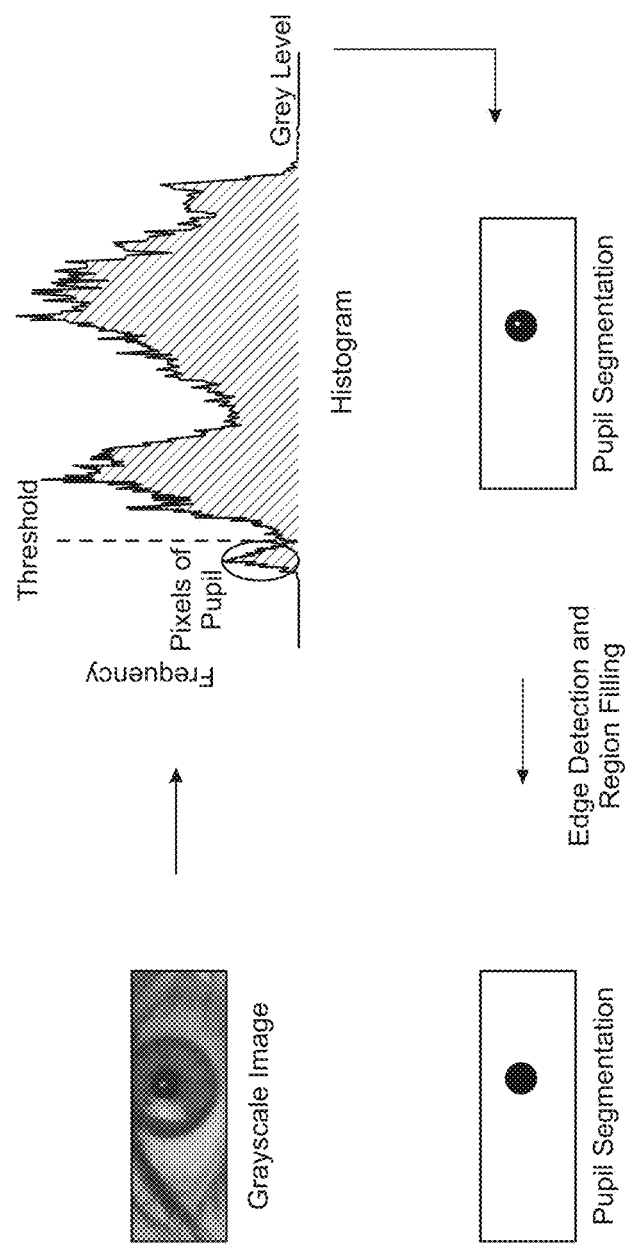
FIG. 8 shows an exemplary pupil segmentation methodology, according to some implementations of the present disclosure.

FIG. 8 shows an exemplary pupil segmentation process. First a greyscale image of an eye is received. Then, a balanced histogram is created based on a grey level of each of the pixels. For example, balanced histogram thresholding segmentation, K-means clustering, or edge detection and region filling might be used. An exemplary balanced histogram segmentation algorithm sets a threshold grey level for the pixels to determine which correspond to the pupil. The pixels corresponding to the pupil will be the darkest pixels.

In one example, K-means clustering chooses k (e.g., k is 4 in this example) data values as the initial cluster centers. The distance between each cluster center and each data value is determined. Each data value is assigned to the nearest cluster. The averages of every cluster are then updated and the process repeated until no more clustering is possible. Each cluster is analyzed to determine which cluster includes the pixels of pupil, getting the segmentation result. This method can be used to segment the interest area from the background based on the four main parts in the eyes having different colors: black pupil, white sclera, colored iris and skin background.

The method shown in FIG. 8 further provides for edge detection and region filling, which enhances the image and links the dominant pixels of the pupil. Holes of certain shapes and sizes are filled to get the final results of segmentation.

After segmentation, the area of the pupil is determined, measured in pixels. This pixel measure is converted to a physical size (e.g. millimeters) based on a scale of the camera which collected the image data.

Red Eye Reflex

Figure 9:
FIG. 9 shows exemplary red eye reflex, according to some implementations of the present disclosure.
Figure 9:
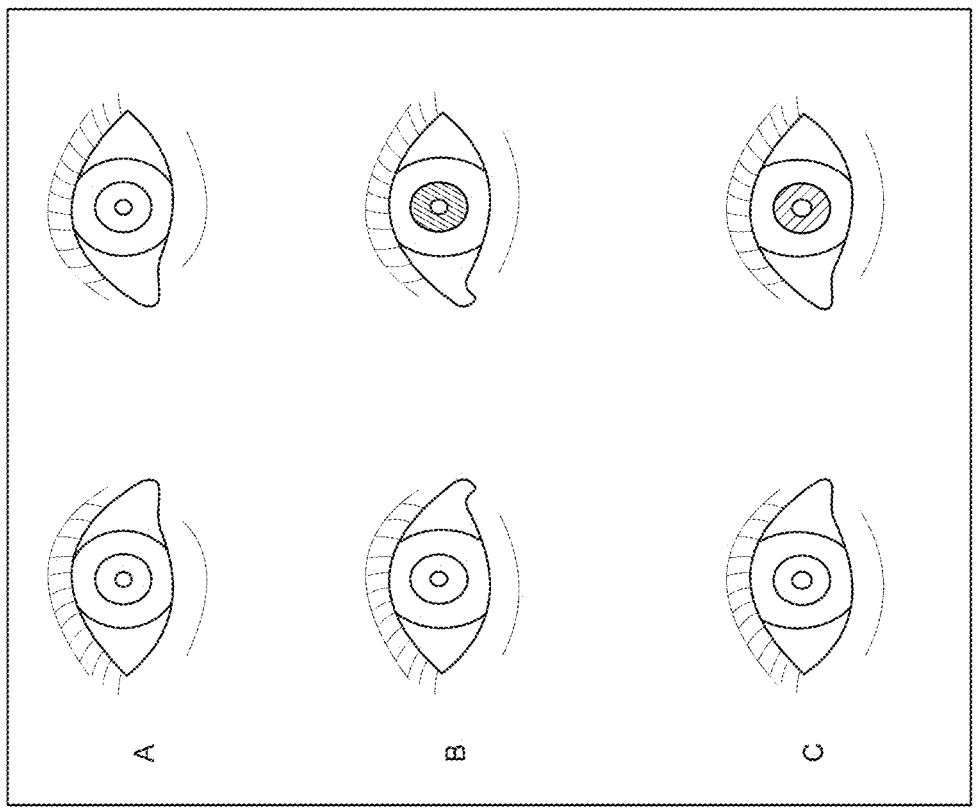

FIG. 9 shows exemplary red-eye reflex data collection, according to some implementations of the present disclosure. For example, image data is collected which highlights the red reflection in the retina of a user's eye. The present disclosure then provides for determining whether the red reflection is dim (which can be a sign of Strabismus or retinoblastoma), whether the reflection is yellow (which can be a sign of Coat's Disease), and/or whether the reflection is white or includes eyeshine (which can be a sign of retinoblastoma, cataracts, retinal detachment, and/or an eye infection). These methodologies can accordingly provide features which are used to determine a health status, according to 330 and 340 of methodology 300 of FIG. 3.

Cornea Light Reflex

Figure 10:
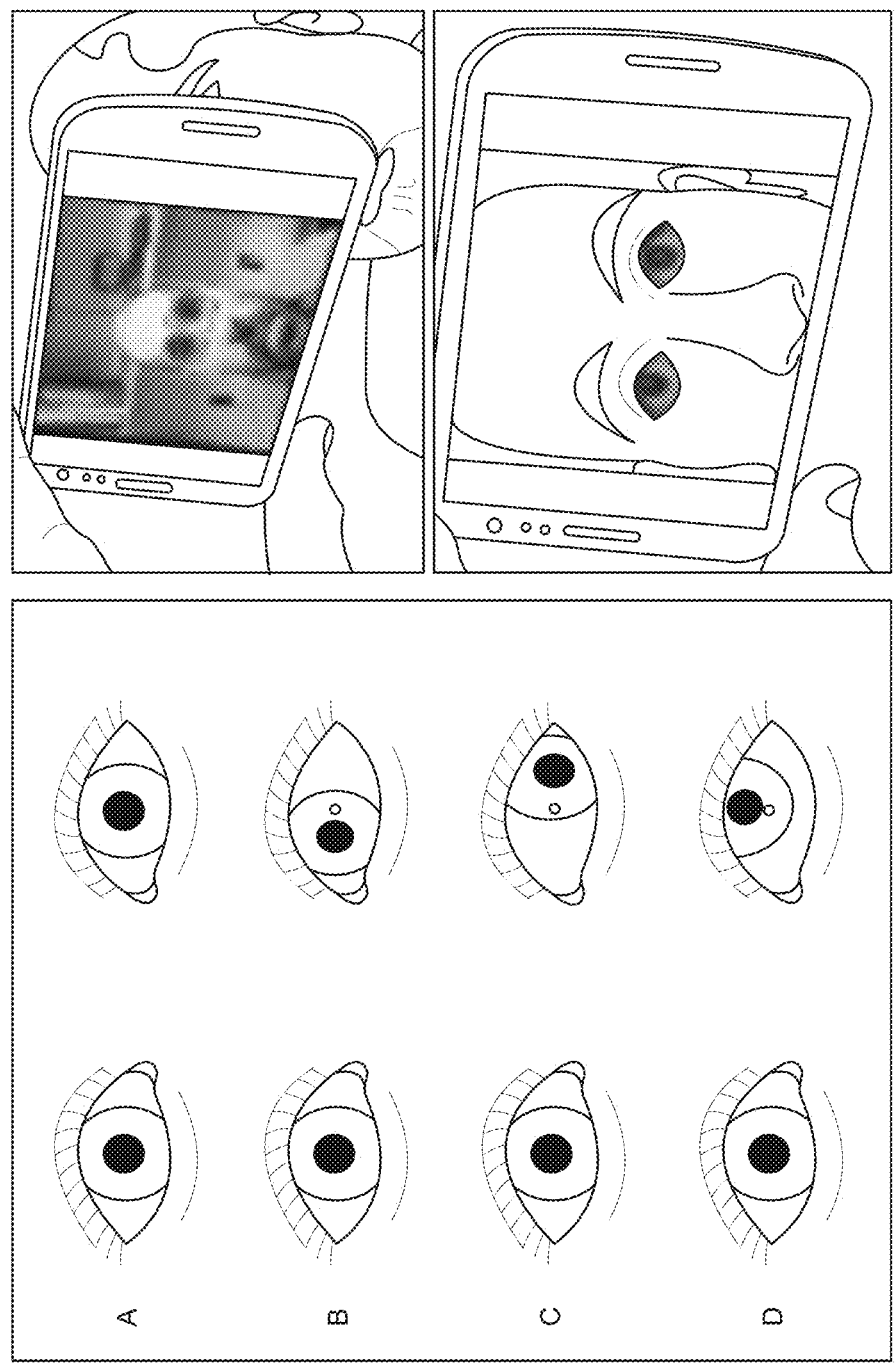
FIG. 10 shows exemplary cornea light reflex, according to some implementations of the present disclosure.

FIG. 10 shows exemplary cornea light reflex data collection, according to some implementations of the present disclosure. For example, image data is collected which captures the degree of strabismus (eye misalignment). The present disclosure then provides for determining whether the captured data includes any of: (A) a tiny light dot in the center of a pupil; and (B), (C) & (D) deviations in dot placement from a center of the pupil, demonstrating eye misalignment. These methodologies can accordingly provide features which are used to determine a health status, according to 330 and 340 of methodology 300 of FIG. 3.

Measuring Pupil Diameter

Figure 11:
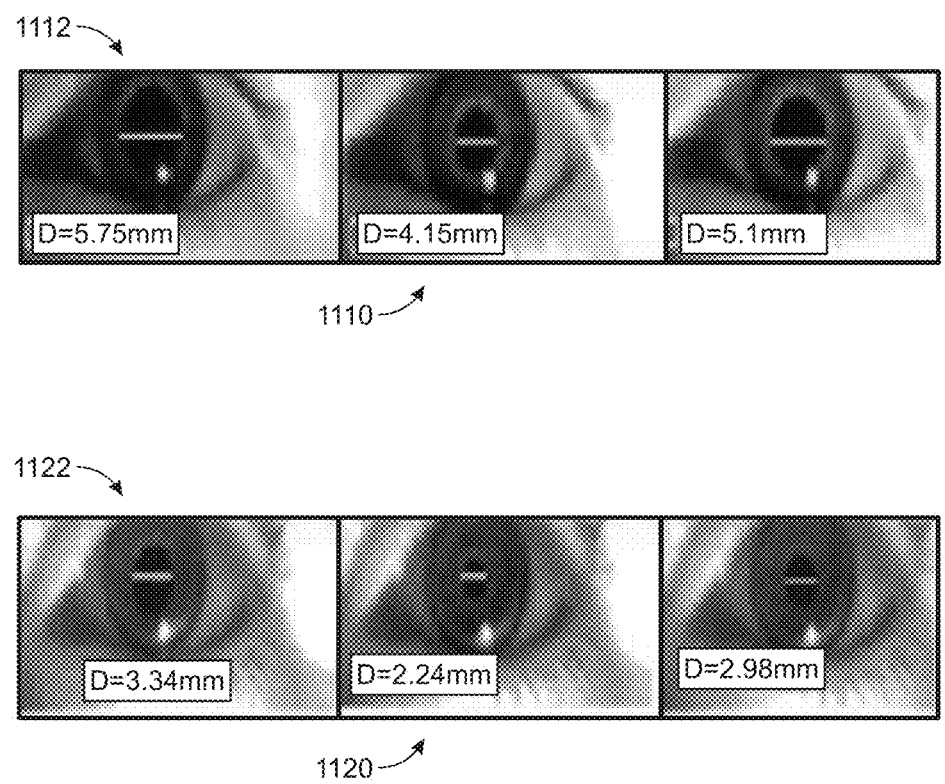
FIG. 11 shows exemplary pupillary constriction, according to some implementations of the present disclosure.

FIG. 11 shows exemplary pupil diameter measurements. For example, 1112 and 1122 show a baseline pupil diameter for subjects 1110 and 1120, respectively. Subject 1110 is healthy and subject 1120 has Alzheimer's Disease. MCV and MCA can be calculated based on the methods discussed herein.

Determining Amount of Visual Stimulus

Figure 14:
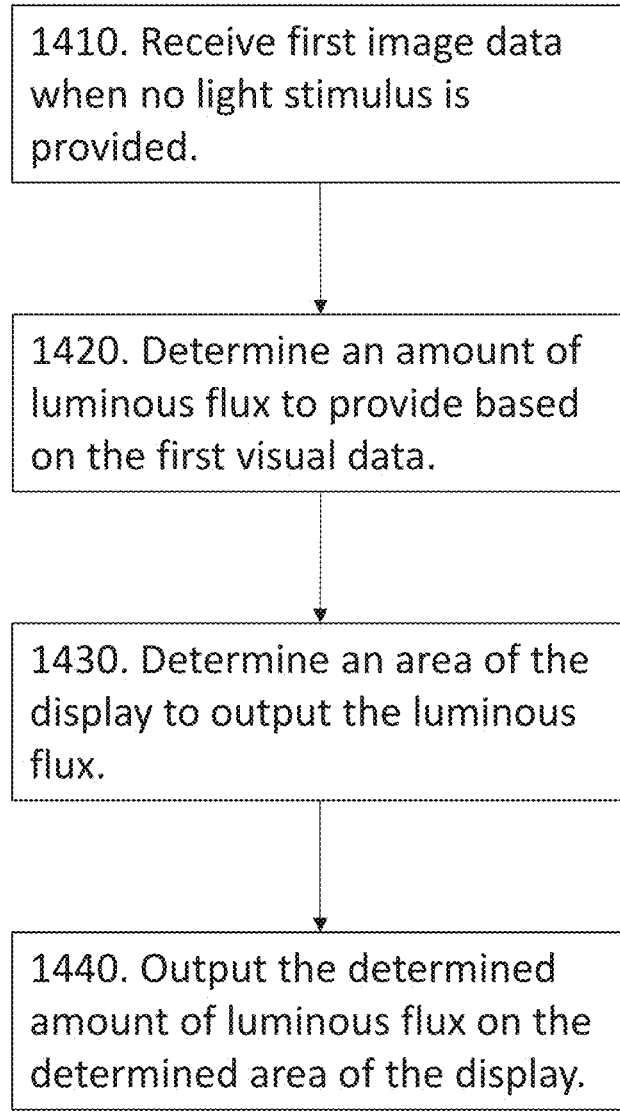
FIG. 14 shows an exemplary method for determining luminous flux, according to some implementations of the present disclosure.

Methodology 1400 of FIG. 14 provides an exemplary method for determining an amount of visual stimulus to provide at a display. For example, methodology 1400 is performed as part of step 310 of methodology 300 of FIG. 3. In some examples, methodology 1400 is performed on systems 100 and 200 of FIGS. 1 and 2, respectively. In some examples, the display stimulus will be utilized in conjunction with an eyelid mediated response, by providing a light stimulus from the display before or when the user open's their eyes, based on a time elapsed or a determination that the user's eye is open. Accordingly, the combination of the dark adaption of the pupils when the eyes are closed, opening the eyes and the light stimulus, will combine to provide a larger light stimulus that may be necessary in some embodiments to trigger a sufficient pupillary light reflex.

Methodology 1400 begins by receiving first image data when no light stimulus is provided, at 1410. For example, camera 114 of system 100 receives image data of a user without providing light stimulus from the display 112 or sensor 116.

Methodology 1400 then provides for determining an amount of luminous flux to provide, at 1420, based on the first image data received from 1410.

In some examples of 1420, the type of light output from the display is also determined. For example, a wavelength of light (or color of light within the visible light spectrum) to be displayed is determined. Each eye of a user has melanoptic receptors that are activated by different colors. Therefore, 1420 provides for controlling the wavelength (or color) of light to activate certain melanoptic receptors in the user's eye and certain receptor pathways. In some examples, these pathways allow delineation of diseases mediated by particular receptor pathways. This may also be based on the ambient light determination. Accordingly, the system may modulate the output of the display as a stimulus based on the amount of ambient light and the wavelength of ambient light.

Methodology 1400 then provides for determining an area of the display to output the luminous flux, at 1430. In some examples, an entire display surface area is used. In other examples, only a portion of the display surface area is used.

In some examples of methodology 1400, the amount of luminous flux and the area of the display to output the luminous flux (e.g., 1420 and 1430) are determined simultaneously, or in any order.

Methodology 1400 then provides for outputting the determined amount of luminous flux on the determined area of the display, at 1440.

In some examples of methodology 1400, additional image data of the eye is received after the luminous flux is output. In some examples, the luminous flux is adjusted based on the received image data.

Identifying Multiple Pupil Responses

Figure 15:
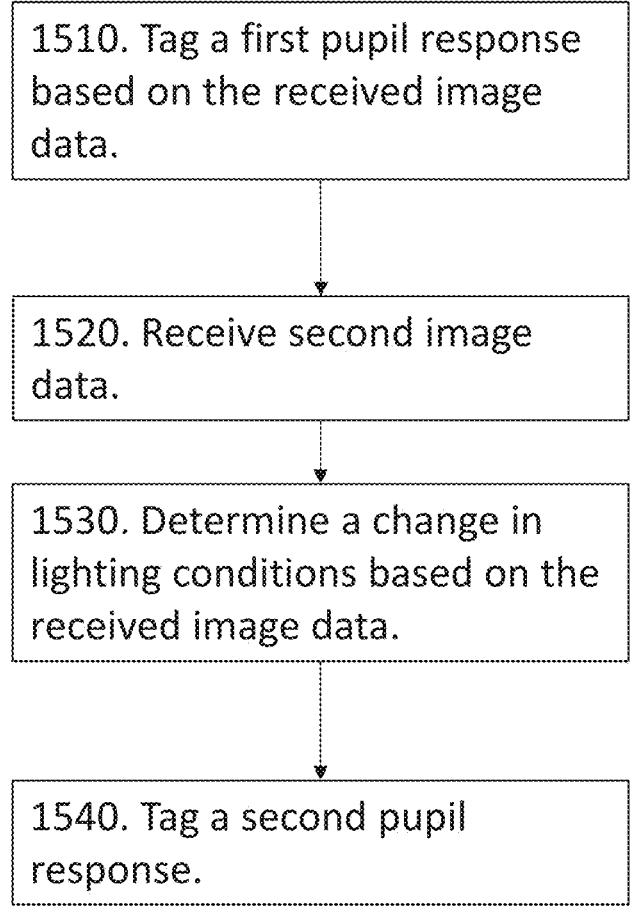
FIG. 15 shows an exemplary methodology for identifying a second pupillary response, according to some implementations of the present disclosure.

In some examples of the present disclosure, a method is provided to identify multiple pupillary responses. For example, such a method identifies whether an image data set is adulterated by unintentional pupil stimulation (e.g., during methodology 300 of FIG. 3). FIG. 15 shows an exemplary methodology 1500 for identifying and tagging unintentional pupil responses, according to some implementations of the present disclosure. For example, methodology 1500 can be performed before, during, and/or after methodology 300 of FIG. 3.

Methodology 1500 of FIG. 15 provides for first, at 1510, tagging a first pupil response based on the received image data. For example, the first pupil response includes a change in any of the pupil features as discussed herein.

Methodology 1500 then provides for, at 1520, receiving second image data, after the originally-received image data.

Methodology 1500 then provides for, at 1530, determining a change in lighting conditions. For example, the change in light conditions can be determined based on a brightness difference between the received image data from 1510 and the received second image data from 1520.

Methodology 1500 then provides for tagging a second pupil response in the second image data, at 1540. For example, if the second image data is a series of images, 1540 provides for identifying the image or images which occur simultaneously, or close in time afterwards to the change in lighting conditions. In some examples, the second pupil response is identified as any one of the pupil features discussed herein.

Infrared Measurements Implementation

Figure 16:
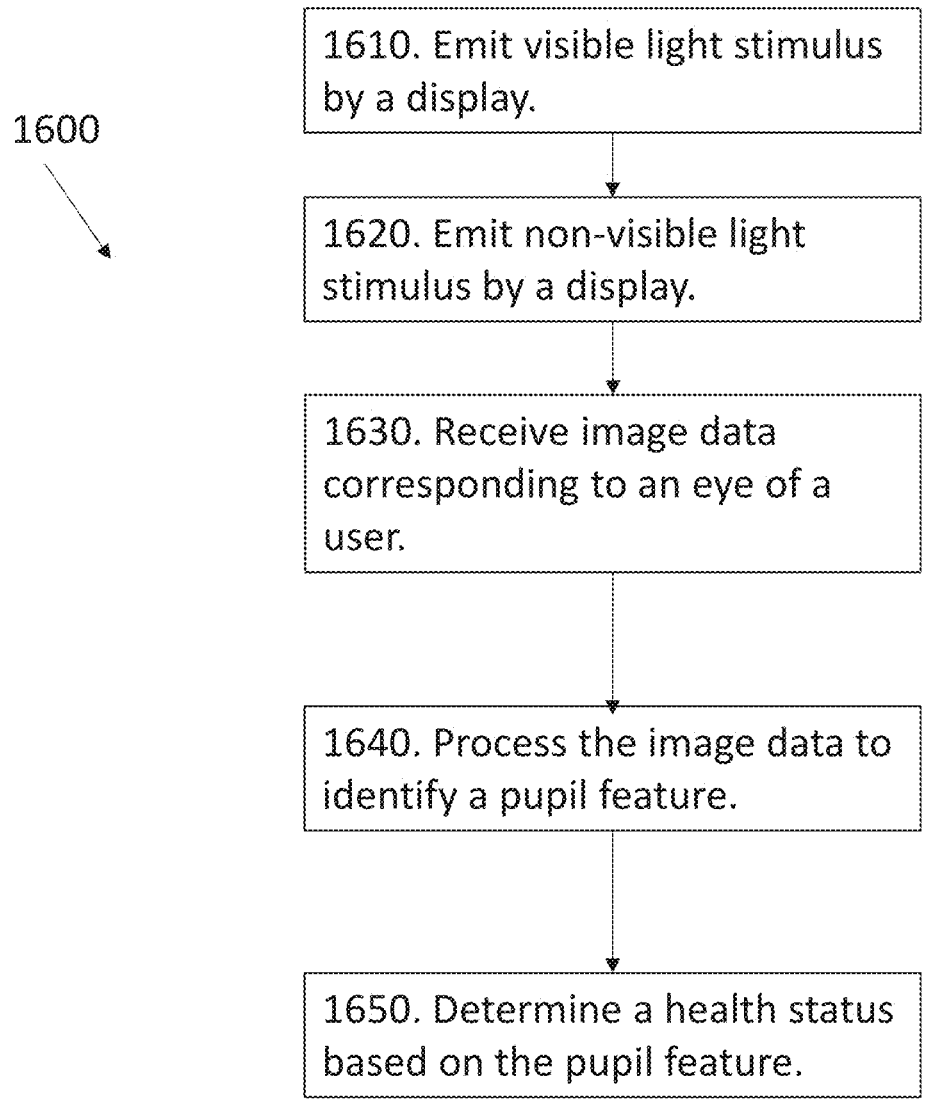
FIG. 16 shows an exemplary methodology for measuring pupillary response with non-visible light, according to some implementations of the present disclosure.

The present disclosure further provides for image capture with non-visible light stimulus and/or an infrared camera. For example, the sensor 116, infrared emitter, and/or the display 112 of FIG. 1 can provide a non-visible light emission. In some examples, the camera 114 is an infrared camera and includes one or more infrared light emitters. FIG. 16 shows an exemplary methodology 1600, which can be performed on systems 100 and/or 200 of FIGS. 1 and 2, respectively. This may be useful for various embodiments disclosed herein, including providing an eyelid mediated response in a dark room that additionally utilizes a screen based visible light stimulus. Accordingly, this will allow a screen based stimulus in a dark room to have an even higher contrast, because the user will close their eyes to block out any remaining light in a dark or dimly lit room.

Methodology 1600 provides for, at 1610, emitting a visible light stimulus by a display (e.g., the display 112 or the sensor 116 of FIG. 1). For example, the visible light stimulus has a wavelength greater than 1000 nm. The visible light stimulus is directed towards the face of a user. This visible stimulus is configured to initiate a pupil response in an eye of the user.

Methodology 1600 then provides for, at 1620, emitting a non-visible light stimulus by a display (e.g., the display 112 or the sensor 116 of FIG. 1, e.g. an infrared emitter). The non-visible light stimulus is configured to illuminate the user's face sufficient to cause a high enough image contrast (sufficiently high enough for pupil-iris segmentation). 1620, therefore, makes use of the high-image contrast that is provided by infrared light generally. For example, the non-visible light stimulus provided at 1620 is a light stimulus with a wavelength between 600 nm and 1000 nm.

Because 1620 provides the illumination sufficient to provide high enough image contrast, methodology 1600 requires less visible stimulus at step 1610 than methodologies which rely only on visible stimulus (including, for example, methodology 300 of FIG. 3). Therefore, methodology 1600 is able to more accurately trigger pupil responses, because the visible stimulus provided at 1610 does not need to illuminate the user's face.

Methodology 1600 further provides for receiving, at 1630, image data corresponding to an eye of a user. In some examples, the image data received is a set of images or a video. In some examples, the set of images are collected at regular intervals (e.g., intervals measured in seconds, milliseconds, and/or microseconds) for a period of time (e.g., over one minute, two minutes, three minutes). In some examples, the image data received at 1630 is received from an infrared camera.

Methodology 1600 further provides, at 1640, for processing the image data to identify a pupil feature. For example, the received image data is processed according to any of the methodologies discussed with respect to 330 of methodology 300 of FIG. 3. Methodology 1600 then provides for, at 1650, determining a health status based on the identified pupil feature. For example, the health status is determined according to any of the methodologies discussed with respect to 340 of methodology 300 of FIG. 3.

Therefore, methodology 1600 avoids confounding pupillary response results with additional, unintentional stimulus.

Identifying Appropriate Lighting Conditions

Figure 17:
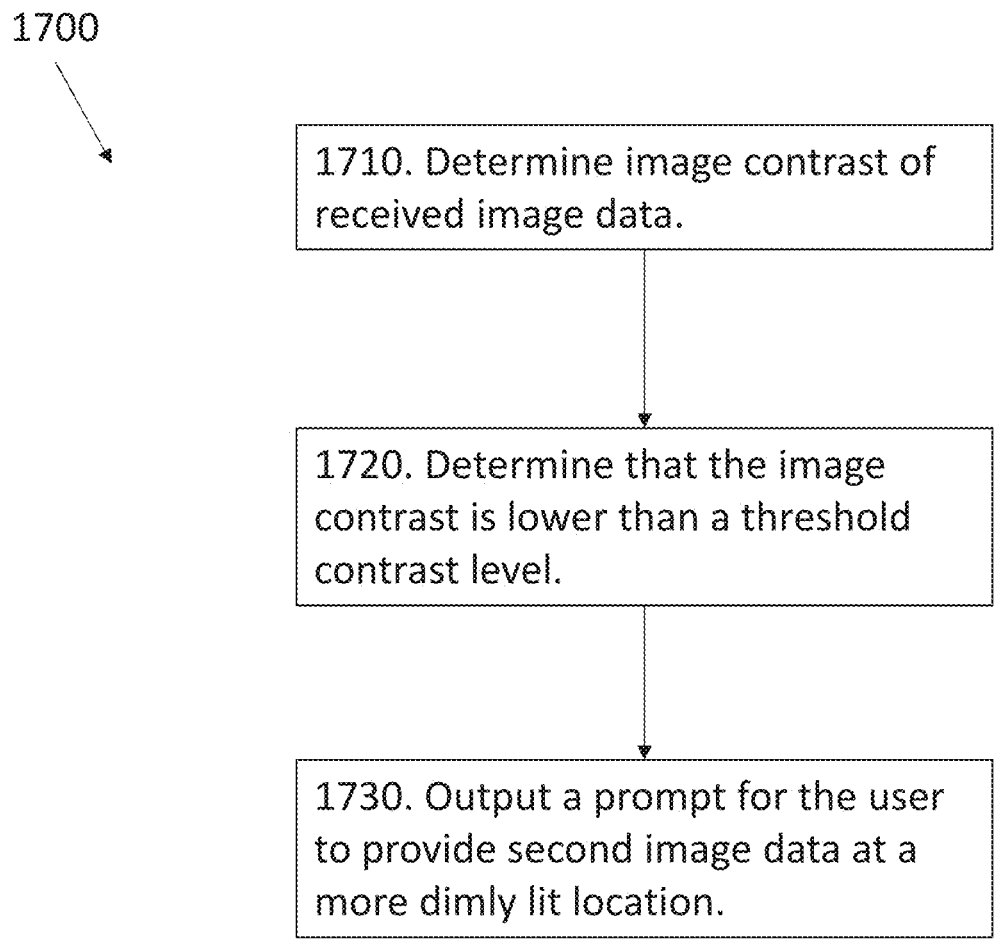
FIG. 17 shows an exemplary methodology for determining proper image contrast, according to some implementations of the present disclosure.

Some examples of the present disclosure provide for automatically detecting whether lighting conditions are sufficient to provide image data of adequate quality to determine the various pupil features discussed herein. FIG. 17 shows an exemplary methodology 1700 for evaluating lighting conditions, according to some implementations of the present disclosure. Methodology 1700 can be performed by systems 100 and/or 200 of FIGS. 1 and 2, respectively. In some examples, methodology 1700 is performed before, after, and/or during methodology 300 and/or methodology 1600 of FIGS. 3 and 16, respectively.

Methodology 1700 provides for, at 1710, determining an image contrast of received image data. For example, the image contrast is determined with respect to brightness, color, saturation, and/or any other visual picture analysis means, as known in the art.

Methodology 1700 then provides for, at 1720, determining whether the image contrast is lower than a threshold contrast level. For example, 1720 provides for determining whether pupil-iris segmentation can be performed based on the image data provided. In some examples, 1720 provides for determining whether pupil-iris segmentation can be performed with a certain accuracy threshold and/or confidence measure.

Methodology 1700 then provides for, at 1730, outputting a prompt for the user to provide second image data at a more dimly-lit location or a more brightly lit location if the stimulus is ambient light mediated by the user's eyelids (e.g., user closing/opening their eyes).

When used in conjunction with methodology 1600, methodology 1700 provides for ensuring that the user is in a dimly lit enough location to provide high contrast for pupil segmentation.

Experimental Data—Infrared Light

Figure 18:
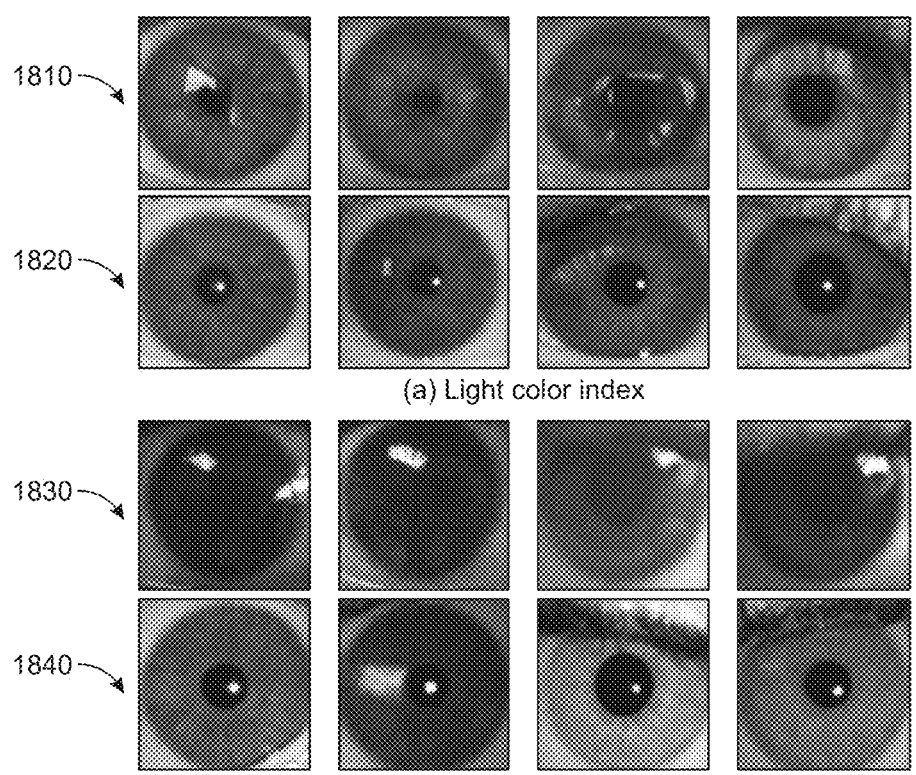
FIG. 18 shows compares exemplary data for pupil-iris segmentation between visible light and non-visible light, according to some implementations of the present disclosure.
Figure 19:
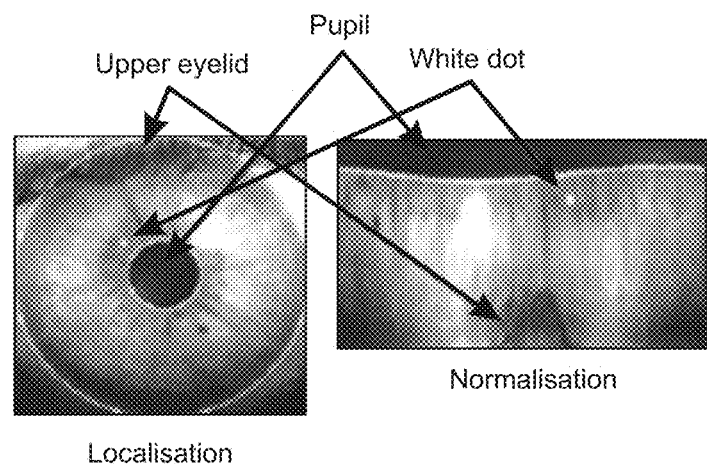
FIG. 19 shows exemplary iris recognition, according to some implementations of the present disclosure.
Figure 20:
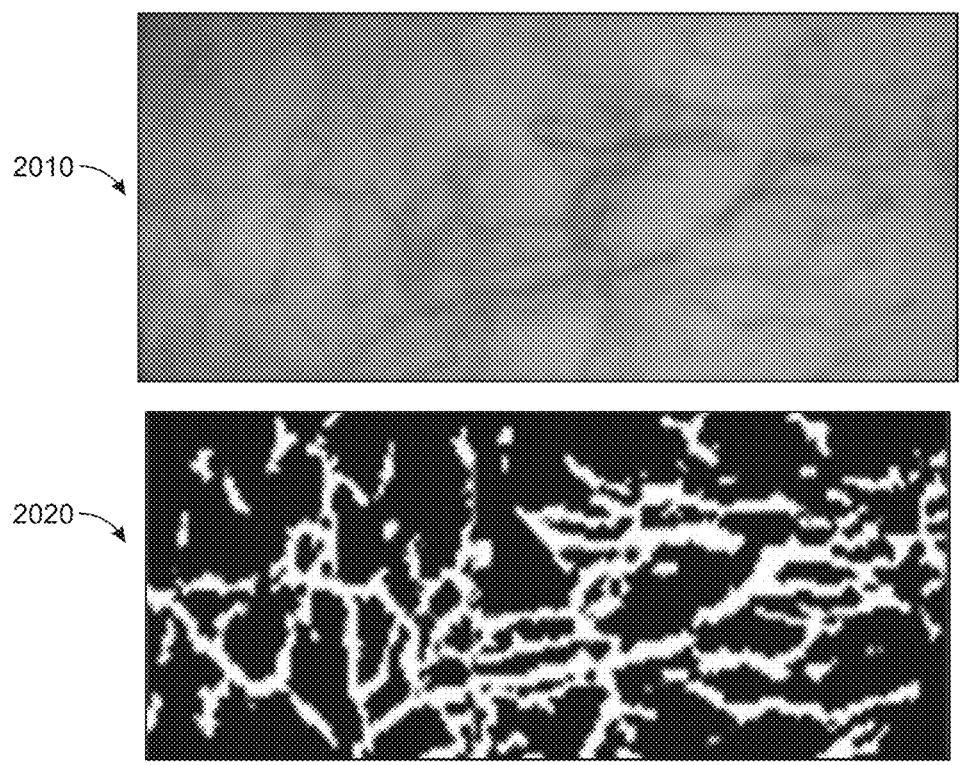
FIG. 20 shows exemplary normalization data when identifying sclera, according to some implementations of the present disclosure.

FIG. 18 shows exemplary image data as compared between sets of images taken in visible light (image sets 1810 and 1830) and sets of images taken in infrared light (image sets 1820 and 1840). Image sets 1820 and 1840 show much clearer delineation between the pupil and the iris of the subject than the image sets 1810 and 1830, which are taken in visible light. In particular, image set 1830 is taken of a dark iris, and pupil segmentation is almost impossible due to the similarity of the colors of the pupil and the iris, and a low contrast between the two. Therefore, FIG. 18 demonstrates the utility of methodology 1600 of FIG. 16, which collects image data with non-visible stimulus, and methodology 1700 of FIG. 17, which ensures that the pupil-iris image contrast is sufficiently high.

Eyelid Mediated Response Implementation

Figure 21:
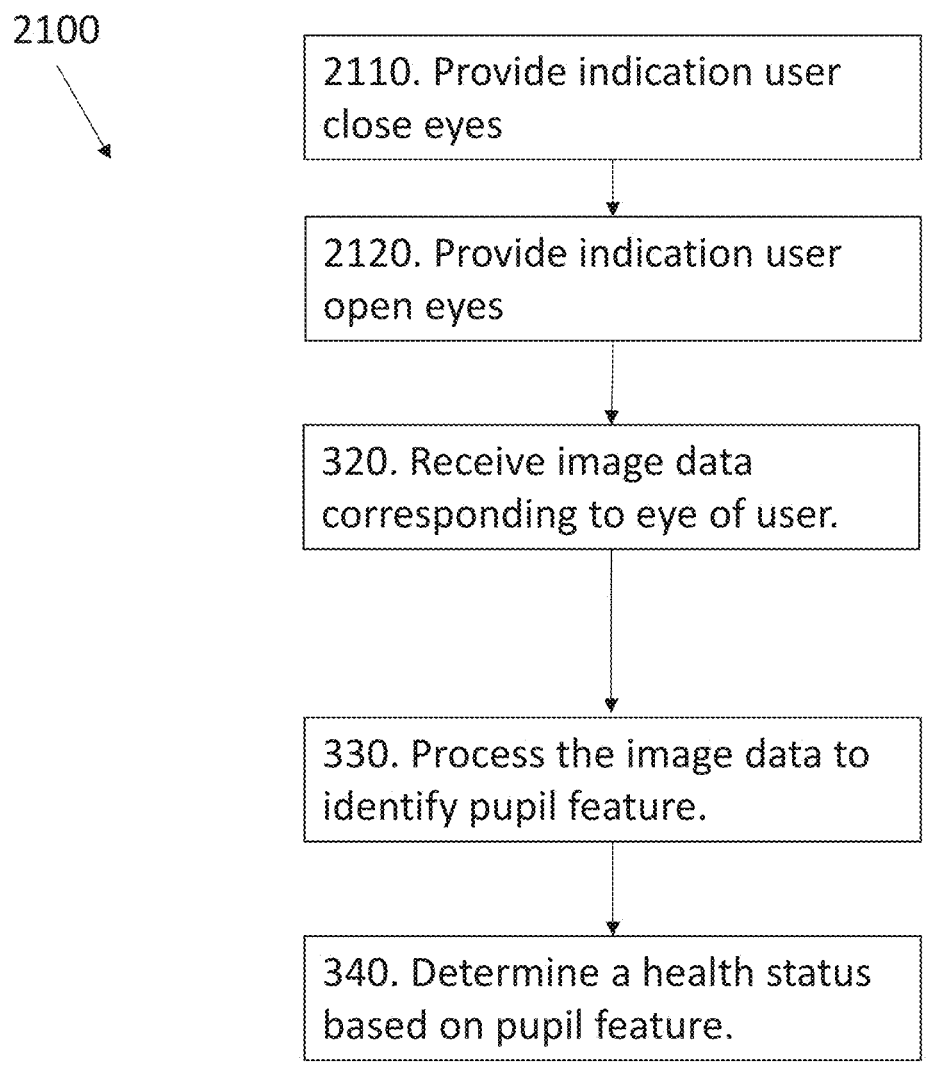
FIG. 21 shows an exemplary methodology for measuring pupillary response with an eyelid mediated stimulus, according to some implementations of the present disclosure.

FIG. 21 is a flow chart providing a detailed example of how to implement the disclosed systems and methods while utilizing the user's eyelids to dark-adapt the pupil and mediate the stimulus using ambient light (herein "eyelid mediated response"). Accordingly, when a user closes their eyelids the pupils will undergo the process of dark-adaptation in which the pupils become accustomed to darkness—effectively dilating the pupil. This will serve as a baseline before the light stimulus is applied (e.g., the user opens their eyes)—facilitating latency measurements and maximal constriction.

For instance, in this example, the system may display instructions for the user to close their eyes for a predetermined amount of time, or until they hear a tone or feel a vibration. This is quite advantageous, because the contrast between the light entering the user's eyes when there are closed and when there are open (and thus allowing all of the ambient light of the room to enter the user's eyes or a screen based stimulus in a dark or dimly lit room) will likely be enough to trigger the pupillary reflex.

For instance, the typically maximum lux emitted from a display at a common viewing distance (e.g. 200 lux) may not be enough to trigger a sufficient pupillary light reflex. (e.g. 300 lux or greater maybe required). However, the contrast between the light entering the eyes in their open and closed states during normal lighting conditions will be sufficient to trigger a pupillary light reflex. Otherwise, it is difficult to ensure sufficient contrast between ambient light and light stimulus to generate a pupillary light reflex as the ambient light may be too bright. Accordingly, the eyelid mediated implementation may circumvent the need for an additional light stimulus (e.g. a flash of light or brightened display). In other examples, the eyelid mediated stimulus may allow the display to provide enough additional stimulus to trigger the response when the baseline dilation starts from when a user has their eyes closed for a sufficient amount of time.

Thus, using this system, in some examples, there is no need for a light based stimulus to be provided by the device. Accordingly, the user may hold the phone with the display facing them (because the flash is not needed). Additionally, the display is not needed to provide a light stimulus to the user's eyes and in some examples a back facing camera may be utilized to assess the eyelid mediated pupillary response. Furthermore, utilizing an eyelid mediated response may be more desirable than flashing light in the user's eyes that is bright enough to trigger the pupillary reflex because it may be more comfortable for the user. In other examples, closing the user's eyes combined with a light stimulus from a display may be enough to trigger a pupillary light reflex.

Also, this method allows the user to easily implement the method in any sufficiently lit or bright room that has enough ambient light to trigger the reflex after the user opens their eyes from a closed and dark-adapted state. FIG. 21 provides an example of implementing this method. In some example, the system may first provide a live feed of image data on the display 112 so the user can line up their eyes properly in front of the camera 114 as described herein (for instance with circles or arrows displayed on the live image data for the user to line up their eyes inside). In other examples, the back facing camera may be utilized and the feedback to the user may be purely audio or vibrational to inform them when to open and close their eyes, and when their eyes are properly aligned with the back facing camera.

Next, the system may provide an indication that the user should close their eyes 2110. This may include a text based message displayed on the display 112. For instance, the display 112 may display the text "close your eyes for [3, 10, 15] seconds" or "close your eyes until you hear a tone [or feel a vibration]." The system may then start a timer for three seconds (or 4 seconds, 10 seconds, 15 seconds, or other suitable times sufficient to trigger a pupillary light reflex) and begin to record image data output from the camera 114 after the set time has elapsed. In other examples, the system will sound a tone or energize a vibration motor after the set time has elapsed notifying the user that they can open their eyes 2120. In those examples, the system will start recording image data once the tone or vibration is initiated or just before.

In some examples, the system may process the image data until it determines that at least one of the user's eyes is open (e.g. computer vision to identify a pupil, iris, or other feature of the eyeball) and detected or filter frames where it determines the user's eye is closed. This may be important, because this will allow the system to identify the first frames where the user's eyes are open (by initiating recording of the camera 114 while the user's eyes are still closed) and therefore capture all or the majority of the pupillary light reflex.

In some examples, this may include determining pupil diameter based on a partial image of the pupil before the user's eyes are fully open or if the user's eyes do not open fully. For instance, the system may extrapolate or otherwise estimate the full diameter of the pupil from a partial diameter. For instance, if the circle angle of the visible pupil is below 360 degrees, known mathematical functions (e.g. trigonometry) can be utilized to estimate the full the pupil diameter. This may include determining the pupil dimeter from a small portion of the pupil being visible (e.g. 90 degrees of visible circle angle). In some examples, the accuracy of the partial measurement's estimation of pupil diameter may be high enough to utilize in the calculation of the health status, including for instance a quantitative measure of the pupillary light reflex.

Additionally, the system may also identify the frames where the user's eyes are properly focused at the camera or a certain point on the screen and thus an accurate measurement of the pupil diameter can be performed. The system may include indications on the display of where the user should focus their gaze (e.g. arrows). In other examples, the system, may be able to determine the direction of the user's gaze and approximate the pupil diameter based on those measurements.

Additionally, the system may continue to monitor the frames to determine that sufficient frames where captured with the user's eye sufficiently open for a sufficient period of time (e.g. user closes their eyes too soon). If there are not a sufficient number of useable frames captured to determine a pupillary light reflex or other relevant pupil features, the process would start over.

Next, the system may receive visual data corresponding to an eye of a user 320 and the system may process the image data in the same manner as described herein with respect to FIG. 3. This includes processing the image data to identify a pupil feature 330 and processing the pupil feature to determine a health status of the user 340.

Experimental Data Example: Using Eyelid Mediated Smartphone Application

The inventor(s) tested an example of an eyelid mediated smartphone application to determine whether this implementation would sufficient to trigger a PLR and detect usage of certain drugs. Accordingly, data generated by measuring PLR across several key metrics using an eyelid mediated response based application post consumption of several key drugs, shows that it is consistent with the expected physiologic effects described herein when tested using an eyelid mediated response based application. Accordingly, the data indicates that an eyelid mediated implementation is able to effectively deliver a sufficient stimulus to effectively evaluate the pupillary light reflex consistent with traditional and established methods for evaluating PLR, and additional detect consumption of certain drugs by patients.

Figure 22A:
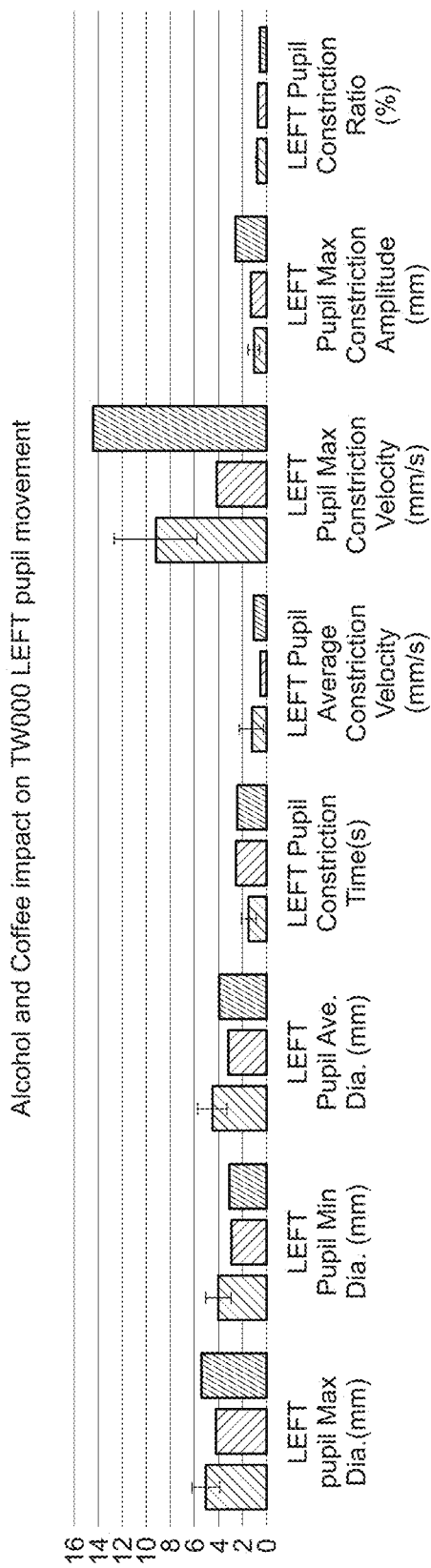
FIG. 22A shows PLR data illustrating impact on certain metrics of left pupil movement post alcohol and coffee consumption, according to some implementations of the present disclosure.
Figure 22B:
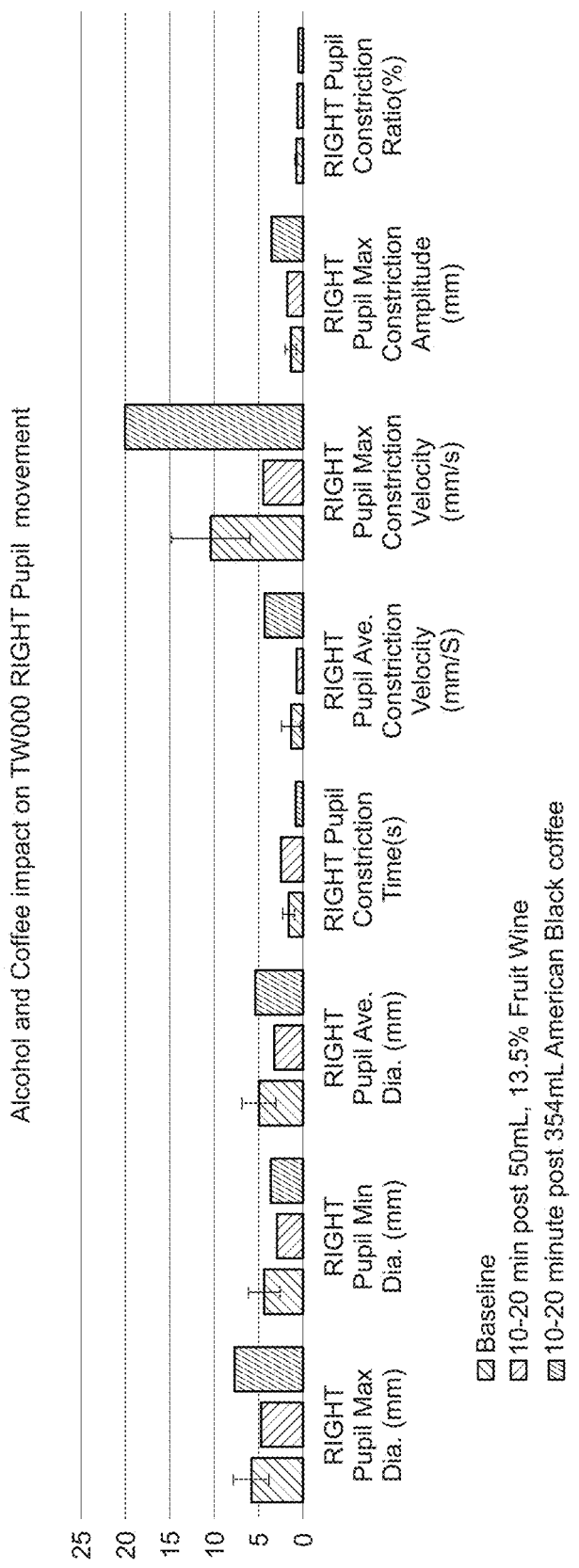
FIG. 22B shows PLR data illustrating impact on certain metrics of right pupil movement post alcohol and coffee consumption, according to some implementations of the present disclosure.
Figure 23A:
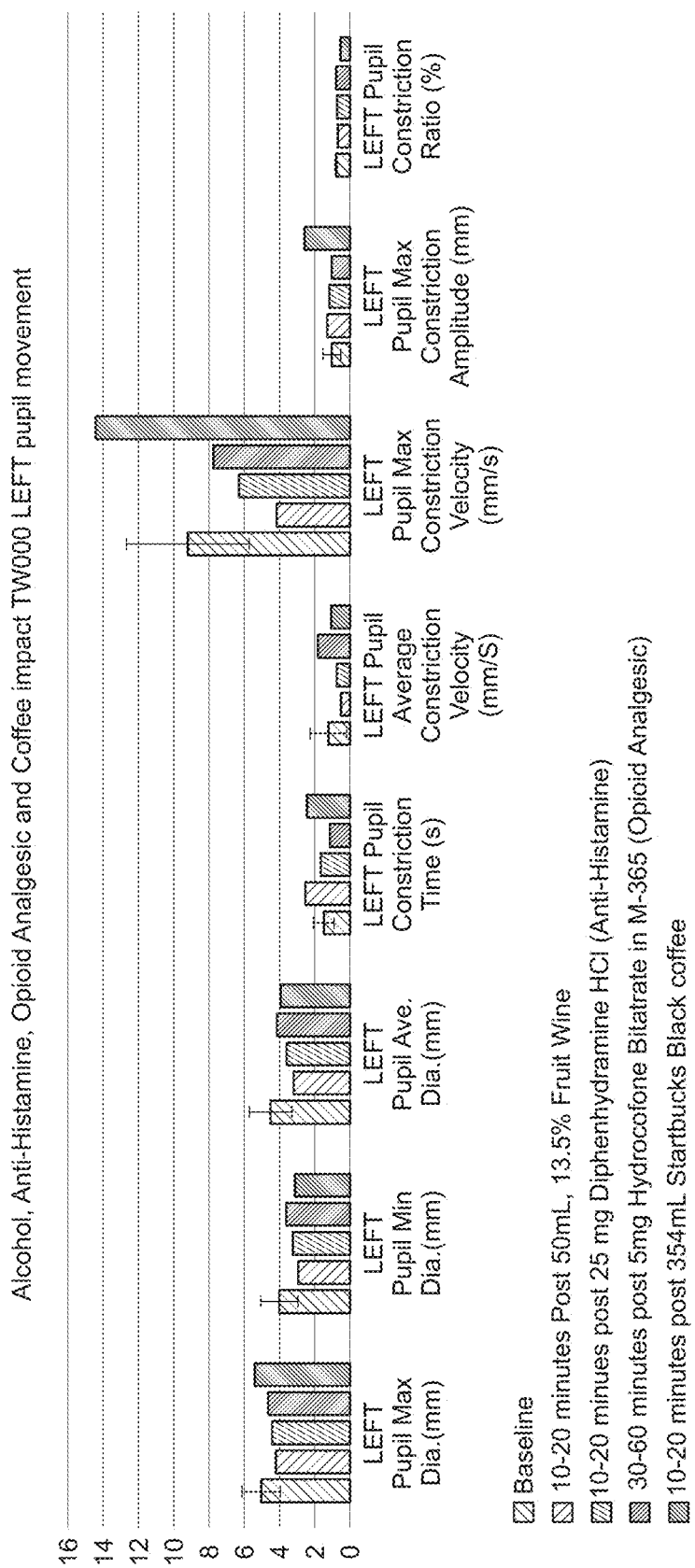
FIG. 23A shows PLR data illustrating impact on certain metrics of left pupil movement post alcohol, anti-histamine, opioid analgesic, and coffee consumption, according to some implementations of the present disclosure.
Figure 23B:
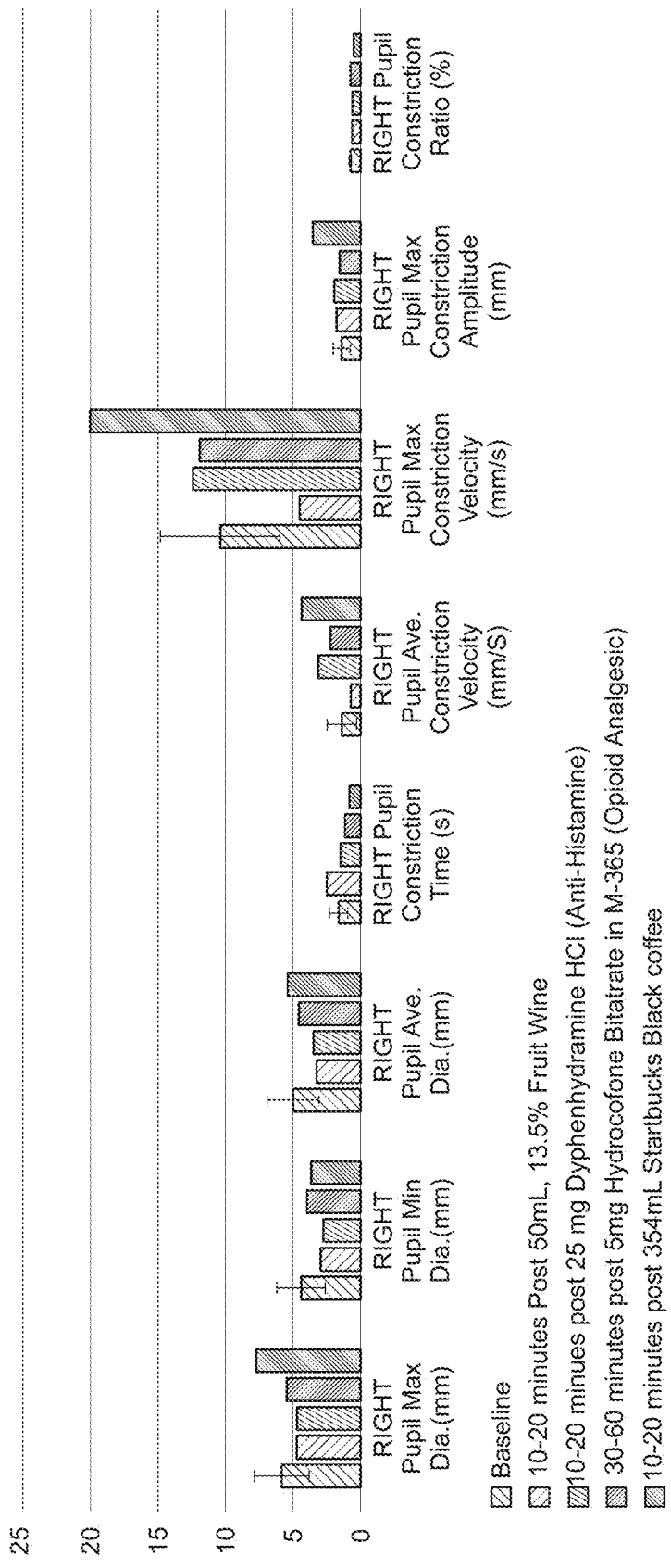
FIG. 23B shows PLR data illustrating impact on certain metrics of right pupil movement post alcohol, anti-histamine, opioid analgesic, and coffee consumption, according to some implementations of the present disclosure.
Figure 24A:
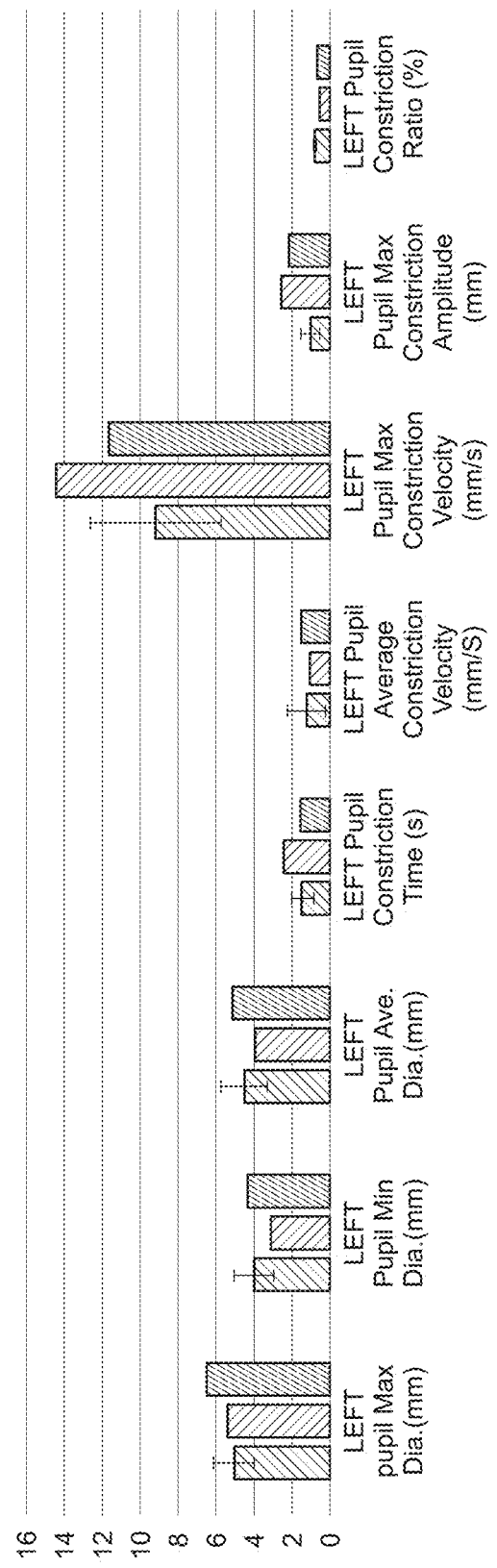
FIG. 24A shows PLR data illustrating impact on certain metrics of left pupil movement post alcohol consumption and morning body stretch, according to some implementations of the present disclosure.
Figure 24B:
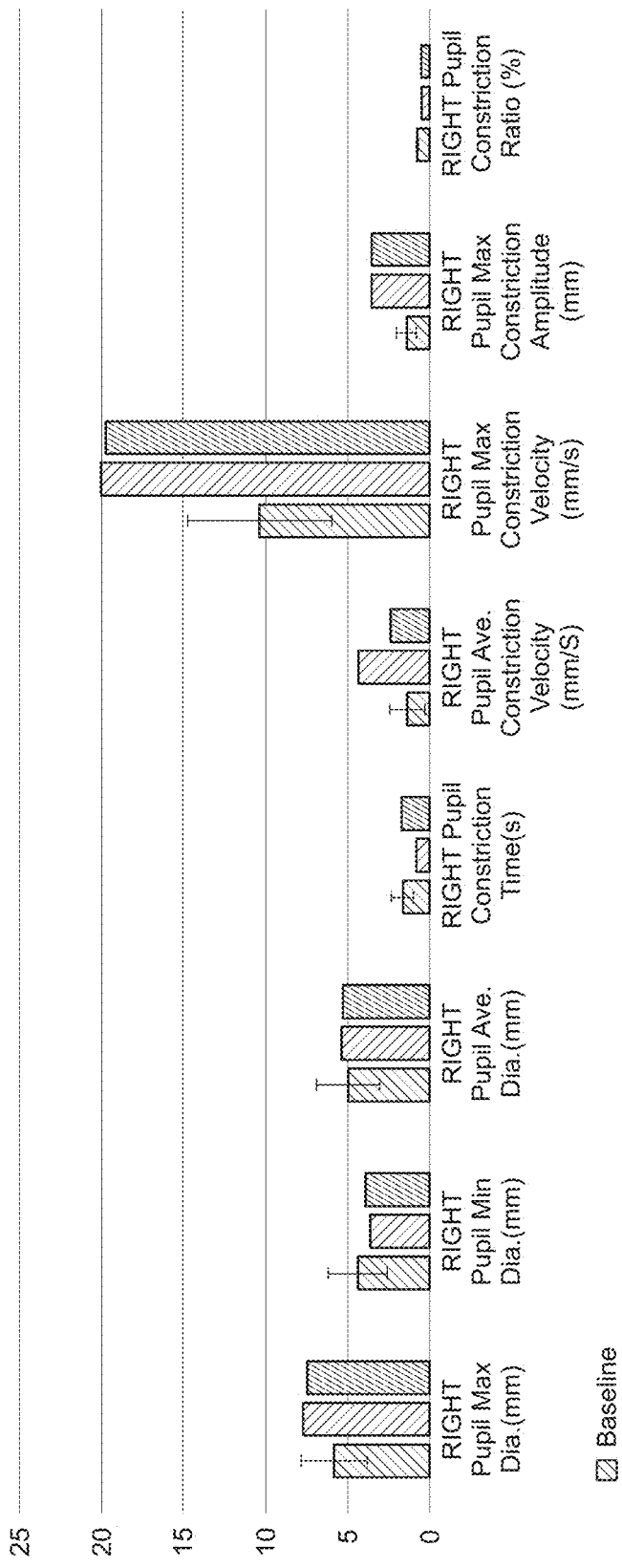
FIG. 24B shows PLR data illustrating impact on certain metrics of right pupil movement post alcohol consumption and morning body stretch, according to some implementations of the present disclosure.

For example, FIG. 22A shows PLR data illustrating impact on certain metrics of left pupil movement post alcohol and coffee consumption using an eyelid mediated based application. For instance, FIG. 22A illustrated that coffee increased velocity noticeably compared to baseline and alcohol slowed velocity. Thus, FIG. 22A confirms that an eyelid mediated response based application on a smart phone or mobile device may be utilized to determine whether a patient has consumed alcohol; FIG. 22B shows PLR data illustrating impact on certain metrics of right pupil movement post alcohol and coffee consumption using an eyelid mediated application; FIG. 23A shows PLR data illustrating impact on certain metrics of left pupil movement post alcohol, anti-histamine, opioid analgesic, and coffee consumption using an eyelid mediated application; FIG. 23B shows PLR data illustrating impact on certain metrics of right pupil movement post alcohol, anti-histamine, opioid analgesic, and coffee consumption using an eyelid mediated application; FIG. 24A shows PLR data illustrating impact on certain metrics of left pupil movement post alcohol consumption and morning body stretch using an eyelid mediated application; and FIG. 24B shows PLR data illustrating impact on certain metrics of right pupil movement post alcohol consumption and morning body stretch using an eyelid mediated application.

Experimental Data: Reproducibility of PLR Data Using Eyelid Mediated Application Table 1 below illustrates the processed reproducibility between the right and left eyes using an eyelid mediated application after applying smoothing techniques. The high scores in Table 1 illustrate that the EMD mediation is highly accurate within a PLR session as the metrics are highly reproducible between eyes.

TABLE 1

Processed reproducibility of metrics between right and left eyes using an eyelid mediated application showing the precision of the ACV measure between eyes.

| Processed Reproducibility | Description | Scores |
| --- | --- | --- |
| PLR MCV | average of percent difference between right & left MCV | 78% |
| PLR MCA | average of percent difference between right & left MCA | 84% |
| PLR ACV | average of percent difference between right & left ACV | 70% |

Table 2 below illustrates the processed standard deviation over time using an eyelid mediated application after applying smoothing techniques. The high scores illustrate the stability of the metrics and reproducibility over time.

TABLE 2

Processed standard deviation of metrics over time using an eyelid mediated application.

| Processed Standard Deviation | Description | Scores |
| --- | --- | --- |
| PLR MCV | MCV standard deviation across people | 0.85 |
| PLR MCA | MCA standard deviation across people | 0.30 |
| PLR ACV | ACV standard deviation across people | 0.39 |

Accordingly, Table 1, and Table 2 illustrate the reproducibility between eyes and over time of PLR metrics using an eyelid mediated application. Thus, the systems and methods disclosed herein may be reliably used to measure features of the PLR.

Additional Software Implementations

Exemplary Software Application

The present disclosure contemplates an exemplary health application, which renders a template having alignment marks for the user's key facial parts on the display for client device. The health application instructs the user to align key facial parts with alignment marks represented on a smart phone screen. The user's facial parts are selected for alignment to ensure trigonometric consistency in depth and angle given these facial parts remain fixed over time in three dimensional space and cannot be voluntarily or involuntarily changed by the user. Client device may provide an indicator, such as a green light, when the measurement is about to be taken. Health application flashes a light on client device and captures a video of the user's eye with a high definition camera that is one of sensors. Using the video, health application determines the pupil diameter reflex velocity— the speed at which the pupil diameter of the user's eye contracts in response to the light and subsequently dilates back to its normal baseline size. Thus, active phenotypic data for the pupil velocity is captured. The pupil velocity may be used to determine whether developing diseases, disorders, or disease precursors for certain neurologic disorders exist. In addition, other phenotypic data may be captured because of the use of the camera. For example, the color of the sclera of the eye is visible. The color of the eye sclera may be used to determine whether various developing diseases, disorders, or disease precursors are present in the user. The eye sclera having a yellow color may be indicative of jaundice. Redness color of the eye sclera may indicate cardiovascular issues due to constriction of blood vessels in the eye. Similarly, redness of the sclera considered in the context of frequency and time of day may be indicative of substance abuse. Other phenotypic features in the ring around the pupil of the eye may be indicative of cholesterol deposits typically associated with cardiovascular issues. Changes in pigmentation or growth of moles on the user's face may be indicative of dermatologic conditions such as melanoma. Thus, a single active test can generate data as quantified measures of multiple phenotypic features related to multiple diseases.

To measure PLR, the user is given instructions for aligning their eyes in the camera. This provides the proper image size for further image processing and pupil measurement. The camera session is started to detect the user's face and obtain images of the user's eyes. The background color and phone brightness (if using front-facing camera) are adjusted (or torchLevel adjusted) to create various levels of lightness/darkness. The images may be processed in real-time including segmentation, obtaining the diameter of the pupil and tracking the time for measuring pupil contraction speeds. Finally, results of the measurements including reaction time for both eyes, contraction speeds, and the percentage of pupil closure may be presented to the user.

Automatic Facial Detection

Automatic facial detection is possible using the tip of the nose and two pupils. In some embodiments, the controlled spatial distance mentioned above is achieved by the user aligning their face with the 3 red triangular dots on the viewfinder (2 for the pupils, 1 for the tip of the nose). Via machine vision, the pupils are recognized as aligned with the red dots and the nose tip (based on RGB color of the nose skin) is aligned with nose tip. Then ambient light sensor is used to check for any ambient light (noise) that would add confounding variables to the measure. If alignment (depth/angle) and lighting are sufficient, then the red dots turn green and the user is notified that the measure is ready to be taken in a certain amount of time. FIG. 12 indicates this process.

A flash is provided and video is captured. Facial detection may be accomplished using one or more frames of the video. Thus, after capture of the video above, with machine vision based algorithmic assistance, the smartphone automatically detects the pixel-based locations of the tip of the nose, as well as the two pupils (which may also be projected on the screen), to ensure measurements are trigonometrically and spatially consistent. The special geometry and distance of these three reference points are cannot be voluntarily nor involuntarily changed over time by the facial muscles, further ensuring control and consistency.

The facial detection/machine vision portion of this measure may be accomplished using open-source and/or proprietary software. Consequently, faces and eyes can be detected (as shown in FIGS. 12-13). The input video/video frames are in grayscale in some embodiments. If a face is detected in the video, the system will proceed to detect eyes within the coordinates of the face. If no face is detected, the user will be notified that the given video does not meet the criteria for effective detection.

A face recognition algorithm to guide the user during a Pre-Capturing phase in real time may be used. In some embodiments, this could be achieved by using the OpenCV (Open Source Computer Vision Library), ARKit (Augmented Reality Kit), or other facial recognition mechanisms. Using face recognition, the eye position on the image can be identified and the user directed to manipulate the device to situate the camera in the desired position. Once the camera is situated—the image data capturing phase may occur. Modern smartphones may have the capacity to emit over 300 nits (1 candela/m2). Video footage can be as short as 10-20 seconds may be sufficient to capture enough data for PLR analysis. Modern smartphone camera(s) (e.g. camera 114 of FIG. 1) are used to capture the video before, during and after the screen flash.

In some embodiments, face capture in combination with face and eye recognition might also be used in performing a PLR measurement. Some facial recognition frameworks, such as Vision Framework, can detect and track human faces in real-time by creating requests and interpreting the results of those requests. Such tool may be used to find and identify facial features (such as the eyes and mouth) in an image. A face landmarks request first locates all faces in the input image, then analyzes each to detect facial features. In other embodiments, face tracking, for example via an augmented reality session, might be used. An example of one such mechanism is ARKit. Using such a mechanism the user's face may be detected with a front-facing camera system. The camera image may be rendered together with virtual content in a view by configuring and running an augmented reality session. Such a mechanism may provide a coarse 3D mesh geometry matching the size, shape, topology, and current facial expression and features of the user's face. One such mechanism may be used to capture and analyze images or multiple mechanisms might be combined. For example, one might be used to capture images, while another is used to analyze the images.

Computer & Hardware Implementation of Disclosure

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Conclusion

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A system for evaluating pupillary light reflex comprising:
   a device comprising a front and a back;
   a camera located on the front of the device;
   a display located on the front of the device;
   a processor; and
   a memory having stored therein a plurality of code sections executable by the processor, the plurality of code sections comprising instructions for:
      displaying a live feed of image data output from the camera on the display;
      displaying visual alignment guidance on the display for the user to align their face using the visual alignment guidance;
      when the ambient light level is below a predefined threshold, causing the display to emit a calibrated visible-light flash stimulus, and
      when the ambient light level meets or exceeds the predefined threshold, displaying an indication on the display requesting that a user close their eyes for at least a dark adaptation interval, and subsequently open their eyes, and
      receiving, from the camera with at least one eye of the user open, high-frame-rate image data corresponding to the at least one eye of the user;
      processing the image data to identify at least one quantitative pupillary response metric; and
      determining a health status based on the at least one quantitative pupillary response metric.

2. The system of claim 1, wherein the instructions further provide for outputting the health status at the display.

3. The system of claim 1, wherein the health status comprises a pupillary light reflex, an alcohol intoxication level, an opioid intoxication level, an anti-histamine consumption level, or a coffee consumption level.

4. The system of claim 1, wherein the displaying an indication on the display requesting that the user close their eyes comprises displaying a text based message requesting that the user close their eyes for at least the dark adaptation interval.

5. The system of claim 1, wherein the displaying an indication on the display that the user should close their eyes comprises displaying a text based message requesting that the user close their eyes until they hear an audible indication after the dark adaptation interval has elapsed to open their eyes.

6. The system of claim 5, wherein the instructions further provide for outputting the audible indication through a speaker.

7. The system of claim 6, wherein the image data is received after outputting the audible indication.

8. The system of claim 7, wherein the instructions further provide for confirming that one or both of the user's eyes are open prior to processing the image data.

9. The system of claim 1, wherein the displaying an indication on the display requesting that the user close their eyes comprises displaying a text based message requesting that the user close their eyes until they feel a vibrational indication after the dark adaptation interval has elapsed to open their eyes.

10. The system of claim 9, wherein the instructions further provide for energizing a vibration motor to create the vibrational indication.

11. The system of claim 1, wherein the visual alignment guidance includes graphical indicators, an augmented reality mesh, overlays, orientation cues, or any combination thereof.

12. The system of claim 11, wherein the instructions further provide for determining when the user's eyes are within the visual alignment guidance.

13. The system of claim 12, wherein the displaying an indication on the display requesting that the user close their eyes is initiated after determining that the user's eyes are within the visual alignment guidance.

14. The system of claim 1, wherein the identifying at least one pupil feature based on the received image data further comprises segmenting the received image data to determine first data portions corresponding to a pupil of the at least one eye and second data portions corresponding to an iris of the at least one eye.

15. The system of claim 1, wherein the at least one pupil feature includes: pupil response latency, constriction latency, maximum constriction velocity, average constriction velocity, minimum pupil diameter, dilation velocity, 75% recovery time, average pupil diameter, maximum pupil diameter, constriction amplitude, constriction percentage, pupil escape, baseline pupil amplitude, post-illumination pupil response, and any combination thereof, compared to a baseline profile for the user.

16. The system of claim 1, wherein the determining a health status based on the at least one quantitative pupillary response metric further comprises:
  determining a difference between each of the at least one quantitative pupillary response metric and a corresponding healthy pupil measurement, wherein the corresponding healthy pupil measurement is retrieved, by the processor, from an external measurement database; and
  determining the health status based on the determined difference for each of the at least one quantitative pupillary response metric and the corresponding healthy pupil measurement.

17. The system of claim 1, wherein the predefined threshold for the ambient light level is the ambient light level that is bright enough to trigger a pupillary light reflex.

18. The system of claim 1, wherein the identifying the at least one quantitative pupillary response metric based on the received image data further comprises:
  determining image contrast of the received image data;
  determining that the image contrast is lower than a threshold contrast level; and
  outputting, on the display, a prompt for the user to provide second image data at a more brightly lit location.

19. A method of evaluating pupillary light reflex, comprising:
  displaying a live feed of image data output from the camera on the display:
  displaying visual alignment guidance on the display for the user to align their face using the visual alignment guidance;
  when the ambient light level is below a predefined threshold, causing the display to emit a calibrated visible-light flash stimulus, and
  when the ambient light level meets or exceeds the predefined threshold, providing a first indication that a user should close their eyes for at least a dark adaptation interval, and subsequently open their eyes; and
  receiving, from a camera, with at least one eye of the user open, high-frame-rate image data corresponding to the at least one eye of the user;
  processing the image data to identify at least one quantitative pupillary response metric ; and
  determining a health status based on the at least one quantitative pupillary response metric.

20. A non-transitory machine-readable medium comprising machine-executable code, which, when executed by at least one machine, causes the machine to:
  display a live feed of image data output from the camera on the display;
  display visual alignment guidance on the display for the user to align their face using the visual alignment guidance;
  when the ambient light level is below a predefined threshold, causing the display to emit a calibrated visible-light flash stimulus, and
  when the ambient light level meets or exceeds the predefined threshold, display an indication on a display requesting a user to close their eyes for at least a dark adaptation interval, and subsequently open their eyes;
  receive, from a camera with at least one eye of the user open, high-frame-rate image data corresponding to the at least one eye of the user;
  process, using at least one or more processors, the image data to identify at least one quantitative pupillary response metric; and
  determine, using the at least one more processors, a pupillary light reflex based on the at least one quantitative pupillary response metric.

* * * * *